(12) United States Patent
Yasui et al.

(10) Patent No.: US 6,271,848 B1
(45) Date of Patent: Aug. 7, 2001

(54) IMAGE PROCESSING DEVICE, IMAGE PROCESSING METHOD AND STORAGE MEDIUM FOR STORING IMAGE PROCESSING PROGRAMS

(75) Inventors: Keisuke Yasui; Kazuyoshi Kasai, both of Tokyo (JP)

(73) Assignee: Sega Enterprises, Ltd., Tokyo (JP)

( * ) Notice: Subject to any disclaimer, the term of this patent is extended or adjusted under 35 U.S.C. 154(b) by 0 days.

(21) Appl. No.: 09/083,092

(22) Filed: May 22, 1998

(30) Foreign Application Priority Data

Aug. 20, 1997 (JP) .................................................... 9-223411

(51) Int. Cl.[7] .................................................. G06T 15/00
(52) U.S. Cl. ................................................ 345/419; 345/420
(58) Field of Search .................................. 345/419, 420, 345/421, 422

(56) References Cited

U.S. PATENT DOCUMENTS 4,924,414 * 5/1990 Ueda ..................................... 364/522
5,872,902 * 2/1999 Kuchkuda et al. .................. 395/130
5,877,097 * 2/1999 Snyder et al. ....................... 345/426
5,923,333 * 7/1999 Stroyan .............................. 345/422

* cited by examiner

*Primary Examiner*—Mark Zimmerman
*Assistant Examiner*—Lance W. Sealey
(74) *Attorney, Agent, or Firm*—Dickstein Shapiro Morin & Oshinsky LLP

(57) ABSTRACT

The present invention conducts rendering processing according to a prescribed priority relating to each polygon attribute. For example, rendering for semi-transparent polygons is conducted after rendering for opaque polygons. By this means, it is possible to carry out rendering for semi-transparent polygons reliably. Furthermore, rendering for polygons containing transparent portions is conducted after rendering for polygons not containing transparent portions. By this means, it is possible to reduce rendering processing for polygons containing transparent portions, as far as possible. Moreover, rendering processing is carried out for all background polygons together. Thereby, it is possible to carry out suitable depth cue processing for polygons positioned in the far distance of the screen.

23 Claims, 17 Drawing Sheets

POLYGON DATA GENERATED BY CPU

POLYGON DATA GENERATED BY GEOMETRY

POLYGON BUFFER

RENDERING SECTION

DATA GENERATED BY RENDERING SECTION

SEMI-TRANSPARENT POLYGON AND OPAQUE POLYGON

SEMI-TRANSPARENT POLYGON
OPAQUE POLYGON

RENDERING PROCESS FOR SEMI-TRANSPARENT, OPAQUE POLYGON
AND OPAQUE POLYGON INCLUDING TRANSPARENT PORTION

OPAQUE POLYGON INCLUDING TRANSPARENCY
PORTION AND OPAQUE POLYGON

POLYGON CONTAINING TRANSPARENT PORTION AND
POLYGON NOT CONTAINING THE SAME

BACKGROUND POLYGON AND OTHER POLYGONS

BACKGROUND POLYGON AND OTHER POLYGONS

BACKGROUND POLYGON AND OTHER POLYGONS
(DEPTH CUE PROCESSING)

BACKGROUND POLYGON AND OTHER POLYGONS

GENERIC COMPUTER FOR IMAGE PROCESSING

IMAGE PROCESSING DEVICE, IMAGE PROCESSING METHOD AND STORAGE MEDIUM FOR STORING IMAGE PROCESSING PROGRAMS

BACKGROUND OF THE INVENTION

1. Field of the Invention

The present invention relates to computer image processing, and more particularly, to an image processing device which controls the order of rendering processing in response to attribute data for polygons constituting an object to be displayed, whereby rendering processing can be carried out reliably and efficiently, and to a method for same, and a recording medium whereon image processing programs for implementing this method are stored.

2. Description of the Related Art

Image processing technology based on computers is used in simulation devices, game devices, and the like. Usually, data for polygons to be drawn on a screen is determined from image data generated by a sequence program for the simulation or game, colour data is determined for each pixel in these polygons, and this colour data is stored in a frame buffer memory corresponding to each pixel of the screen. An image is then displayed on a display device, such as a CRT, in accordance with the colour data in the frame buffer memory.

The process of determining the aforementioned polygon data is usually carried out by a geometry processing section, whilst the process of determining colour data for each pixel from the polygon data is carried out by a rendering section. The polygon data produced by the geometry processing section generally comprises vertex data. The colour data for pixels in a polygon is determined by interpolation of the parameter values contained in the vertex data.

However, in some cases, a frame may contain a plurality of polygons which overlap with each other, and in this event, only the portions of polygons which are foremost in the screen are displayed, whilst the portions of polygons which are covered by another polygon are not displayed. Therefore, conventionally, a Z-value buffer memory corresponding to the pixels in each frame is provided, and when the colour data for a pixel to be displayed is written into the frame buffer memory, the Z-value for that pixel is written into a region of the Z-value buffer memory corresponding to the pixel. The operation of deciding whether or not a pixel in a polygon processed subsequently is positioned in front of a pixel already written to the memory is carried out by comparing their respective Z values. Therefore, when the Z value for a pixel is greater than the Z value in the Z value buffer, its colour data is not produced and written to the frame buffer, since this pixel will not be displayed. In this way, the efficiency of the rendering process is improved.

The Z-value described above means depth value indicating a depth in a display screen. For the convenience, the depth value is referred to Z-value hereinafter.

Alternatively, as a further algorithm, the colour data may always be written to the frame buffer starting from the polygon which is foremost in the frame. By adopting this method, it is possible to avoid making purposeless calculations when determining the colour data.

However, as well as opaque polygons, there also exist semi-transparent polygons. In order to make the generated images more realistic, it is necessary to provide processing for blending the colour of a semi-transparent polygon with the colour of a different polygon positioned behind it. In this case, when a pixel under processing is semi-transparent, a suitable blending process is carried out with reference to the frame buffer memory.

However, if the colour data for a semi-transparent pixel positioned to the front of the screen is written to the frame buffer memory first, and a pixel in a further polygon positioned behind this pixel is rendered subsequently, it will not be possible to judge whether or not a blending process is necessary. Therefore, in the aforementioned algorithm, colour data for pixels in the further polygon positioned to the rear will not be accounted for in the colour data for the pixels in the semi-transparent polygon. This cannot be regarded as a suitable rendering process.

In order to resolve this point, it is possible, for example, firstly to sort the polygons to be displayed on the screen by means of their Z values, and then to render the polygons in sequence, starting from the polygon positioned furthest to the rear. In this case, since a polygon positioned towards the front of the screen will always be rendered subsequently, rendering for semi-transparent polygons can be carried out reliably. However, using this algorithm, it is necessary to conduct a rendering process for all of the polygons, which means that the colour data for polygons positioned towards the front of the screen will usually be written over previous data, and therefore the efficiency of the rendering process will be poor. A time-consuming rendering process is undesirable, since it places limitations on the number of objects that can be displayed in a screen, and on other special processing.

Furthermore, appropriate special rendering processes may be required not only due to the relationship between opaque polygons and semi-transparent polygons, but also, for instance, the relationship between opaque polygons containing transparent pixels and other polygons, or the relationship between background polygons and polygons located in the far distance from the viewpoint displayed on the screen. In these cases also, the priority of the rendering operations must be taken into account in order to achieve suitable processing and high processing efficiency.

Therefore, taking the aforementioned problems of the related art into consideration, the purpose of the present invention is to provide an image processing device, whereby more realistic images can be generated and the efficiency of rendering processing can be improved, and a method for same and a storage medium whereon image processing programs for implementing this method are stored.

The purpose of the present invention is also to provide an image processing device, whereby rendering of semi-transparent polygons can be carried out appropriately and a high processing efficiency can be achieved, and a method for same and a storage medium whereon image processing programs for implementing this method are stored.

The purpose of the present invention is also to provide an image processing device, whereby rendering of polygons containing transparent portions can be carried out with good efficiency, and a method for same and a storage medium whereon image processing programs for implementing this method are stored.

The purpose of the present invention is also to provide an image processing device, whereby rendering of polygons positioned in the far distance can be carried out appropriately and high processing efficiency can be achieved, and a method for same and a storage medium whereon image processing programs for implementing this method are stored.

SUMMARY OF THE INVENTION

In order to achieve the aforementioned objects, the present invention conducts rendering processing according to a prescribed priority relating to each polygon attribute. For example, rendering for semi-transparent polygons is conducted after rendering for opaque polygons. By this means, it is possible to carry out rendering for semi-transparent polygons reliably. Furthermore, rendering for polygons containing transparent portions is conducted after rendering for polygons not containing transparent portions. By this means, it is possible to reduce rendering processing for polygons containing transparent portions, as far as possible. Moreover, rendering processing is carried out for all background polygons together. Thereby, it is possible to carry out suitable depth cue processing for polygons positioned in the far distance of the screen.

In an image processing device for generating image data by conducting rendering processing for a plurality of polygons, the present invention comprises: polygon data generating section for generating polygon data containing, at the least, two-dimensional co-ordinates in a display screen, a Z value (depth value) indicating a depth in the display screen, and attribute data indicating the type of polygon, for polygons positioned in a display screen; a polygon buffer memory for storing the polygon data for a frame separately in accordance with the attribute data; and a rendering section, which is supplied with the polygon data in a prescribed order of priority of the attribute data and generates the image data for pixels in the polygons from the polygon data.

In an image processing method for generating image data by conducting rendering processing for a plurality of polygons, the present invention comprises the steps of: generating polygon data containing, at the least, two-dimensional co-ordinates in a display screen, a Z value (depth value) indicating a depth in the display screen, and attribute data indicating the type of polygon, for polygons positioned in a display screen; storing the polygon data for a frame in a polygon buffer memory separately in accordance with the attribute data; and rendering for generating the image data for pixels in the polygons from the polygon data, in a prescribed order of priority relating to the attribute data in the polygon data.

Furthermore, the present invention is a storage medium whereon programs for causing a computer to implement the aforementioned image processing method are stored.

DESCRIPTION OF THE PREFERRED EMBODIMENTS

Below, preferred embodiments of the present invention are described with reference to the drawings. However, the technical scope of the present invention is not limited to these modes of implementation.

Basic composition

Figure 1:
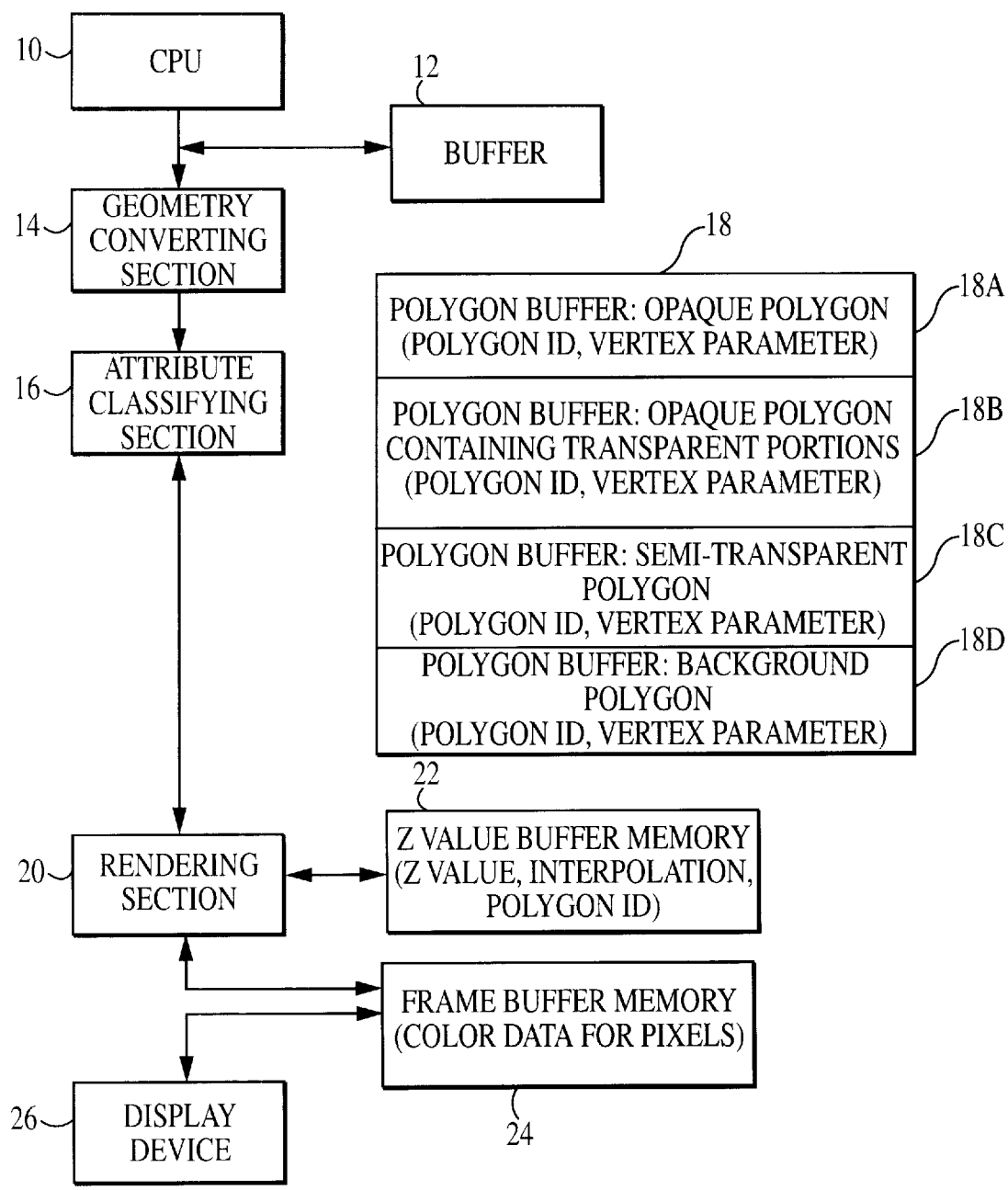
FIG. 1 is a diagram showing the overall composition of an image processing device according to an embodiment of the present invention.

FIG. 1 is a diagram showing the general composition of an image processing device according to an embodiment of the present invention. The CPU 10 is connected to a RAM and ROM (omitted from drawing), and it receives operational command signals from an external input operating section(not shown). A storage medium inside the RAM or ROM, or the like, stores game programs or simulation programs, for example, as well as object data comprising a plurality of polygons.

The CPU 10 executes game programs or the like in accordance with the operational command signals, and it generates a display list containing polygon data required for display, viewpoint data, and the like. This display list is supplied to an image processing section comprising a geometry converting section 14 and a rendering section (renderer) 20, etc., and image data for displaying an image on a display screen is generated by the image processing section. This image data represents colour data for each pixel in a single frame, for example, and it is stored in a frame buffer memory 24. A display device 26 displays images in accordance with the colour data in the frame buffer memory 24.

Buffer 12 is a memory for temporarily storing the aforementioned display list. Z value buffer memory 22 is a memory for recording Z values indicating the depth in the screen of each pixel to be displayed.

The characteristic feature of this embodiment lies in the fact that an attribute classifying section 16 is provided in the geometry converting section 14, or at the output thereof, and this classifies the polygon data generated by the geometry converting section 14 according to the polygon attribute data, and then stores it in the polygon buffer memory 18. When is stored in the polygon buffer memory 18, data is classified such that polygon data having the same attribute data can be extracted. The specific composition of this polygon buffer memory 18 is described below.

In the example shown in FIG. 1, the polygon attributes comprise: opaque polygons 18A, opaque polygons containing transparent portions 18B, semi-transparent polygons 18C, and background polygons 18D. An opaque polygon is the most general type of polygon, and it is written over any other polygon positioned behind it in the display screen. Therefore, it is not affected by the colour data for any other polygon. An opaque polygon containing transparent portions might be, for instance, a "tree", or the like, which cannot be represented by a polygonal shape, and therefore a "tree" pattern is attached to the texture of a multiple-sided polygon and transparent texture data is attached to regions outside this tree pattern. Consequently, this type of opaque polygon is essentially an opaque polygon, but it contains transparent portions in regions thereof, and the pixels in these regions are overwritten in the frame buffer memory with colour data for polygons positioned behind them in the screen.

In the case of a semi-transparent polygon, it is necessary to carry out a blending process with the colour data of polygons positioned to the rear of it. The extent to which the colour data of the polygons positioned to the rear is blended varies depending on the degree of transparency of the semi-transparent polygon. Furthermore, "background polygons" are polygons corresponding to a "mountain", "cloud", or the like, positioned in the far distance from the viewpoint. These background polygons are used when implementing depth cue effect processing, which is a type of shading process, for polygons located in the far distance from the viewpoint. Namely, rather than having to display polygons in the far distance clearly, it is possible to create a more realistic image by displaying them with an obscured appearance of some kind. Therefore, in such cases, shading is carried out by a process of blending with the colour data for polygons in the background.

As described above, firstly, when drawing a semi-transparent polygon by means of rendering, it is not possible to carry out a suitable rendering process unless the rendering of polygons positioned behind the semi-transparent polygon has been completed. Secondly, for polygons located in the far distance, a process of some kind must be provided for blending with the colour data of background polygons. Therefore, in the present embodiment, polygons are first classified according to their attribute data and stored in a polygon buffer memory 18, and rendering is then carried out for all polygons of a particular attribute together, according to a suitable order of priority. Polygon data is read out from the polygon buffer memory 18 by the geometry converting section 14 or rendering section 20 in accordance with this order of priority.

The image processing device illustrated in FIG. 1 conducts geometry conversion processing and rendering processing for polygon data supplied by the CPU 10, in a serial fashion using a pipeline format, for example.

Figure 2:
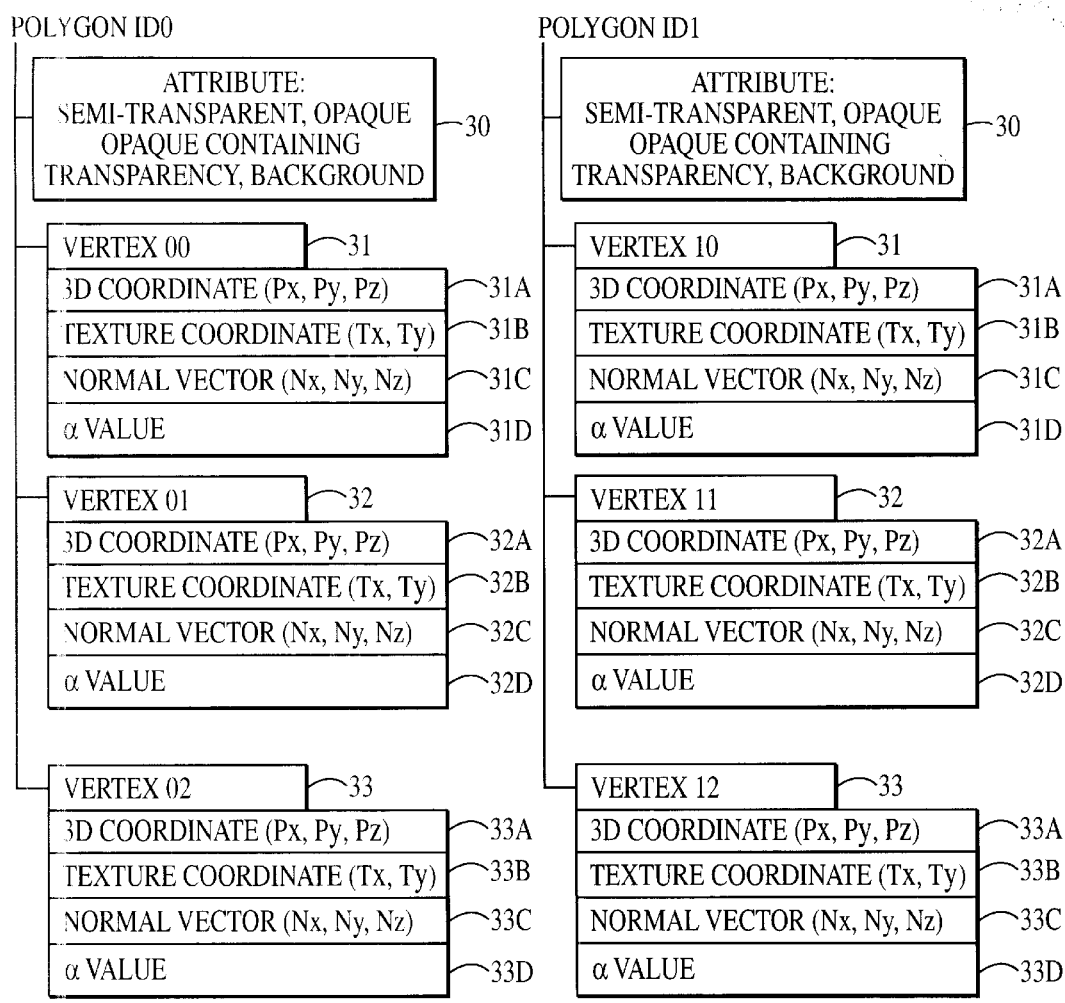
FIG. 2 is a diagram showing examples of the composition of polygon data supplied by a CPU 10 to a geometry converting section.

FIG. 2 shows examples of the composition of polygon data supplied by the CPU 10 to the geometry converting section 14. Generally, polygon data comprises data for vertex parameters of the polygon. For example, in the case of a triangular polygon, which is the most common type, it will comprise three vertex data items 31, 32, 33, as illustrated in FIG. 2. These vertex data items comprise, for example: three-dimensional co-ordinates for the vertex (Px, Py, Pz) 31A, 32A, 33A; texture co-ordinates (Tx, Ty) 31B, 32B, 33B; normal vectors (Nx, Ny, Nz) 31C, 32C, 33C; and an alpha value 31D, 32D, 33D representing transparency. FIG. 2 shows the data composition for two polygons ID0 and ID1.

Moreover, attribute data 30 indicating the attribute of each polygon is also supplied in the polygon data. As described previously, this attribute data 30 indicates which polygon type the polygon is attributed to, namely, semi-transparent polygons, opaque polygons, opaque polygons containing transparency portions, or background polygons. In other words, the CPU 10 supplies this attribute data for the polygon as attribute data in the polygon data.

The CPU 10 supplies the aforementioned polygon data to the geometry converting section 14, along with a register set function containing information on the repositioning of the polygons in a three-dimensional space. The geometry converting section 14 carries out conversion processing for repositioning the polygons in a three-dimensional space in accordance with the register set function. The geometry converting section 14 also carries out a clipping process for selecting the polygons located within the viewport represented by the display screen, and it converts these polygons to the two-dimensional co-ordinates space of the display screen in accordance with viewpoint data.

Figure 3:
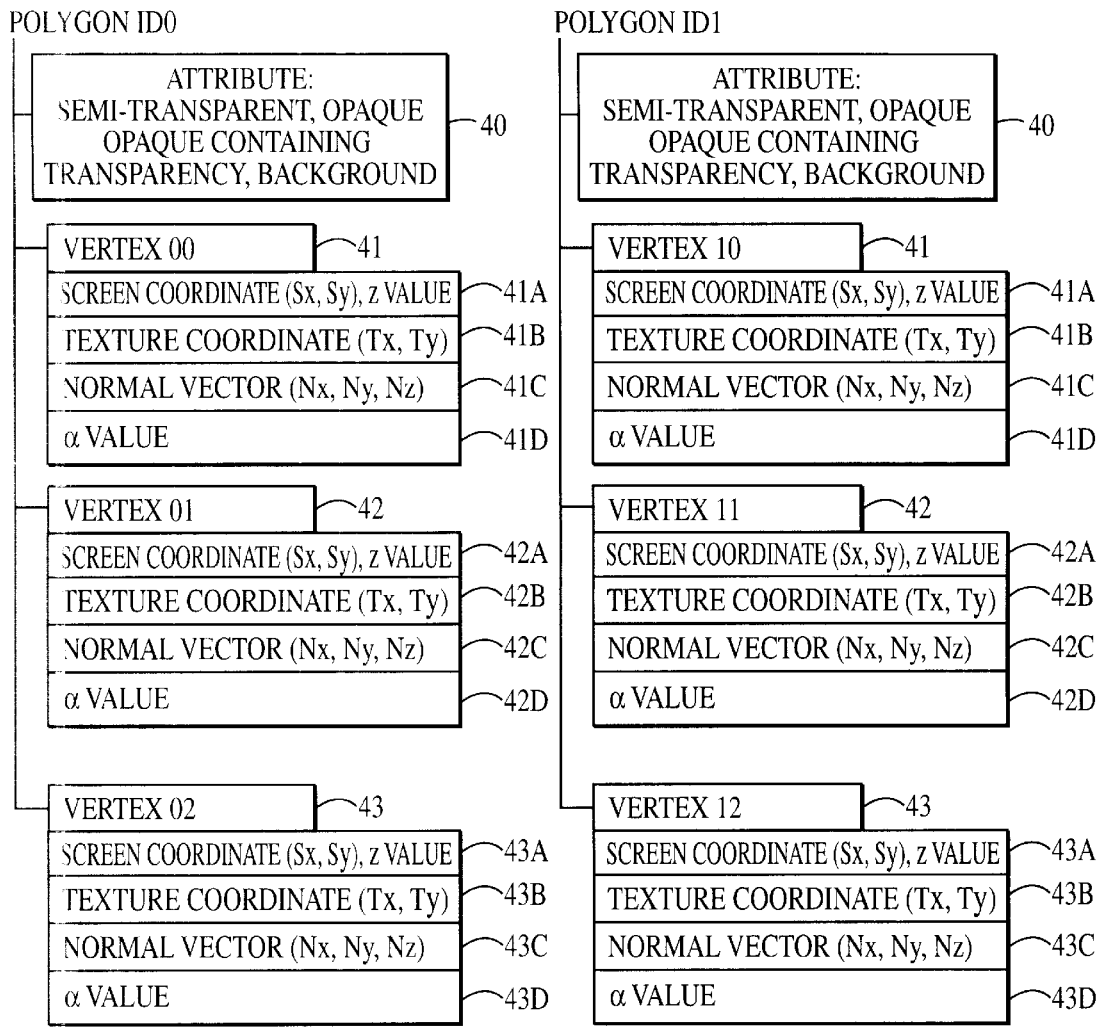
FIG. 3 is a diagram showing examples of the composition of polygon data generated by the geometry converting section.

FIG. 3 shows examples of the composition of polygon data generated by the geometry converting section 14. In this data composition, the three-dimensional co-ordinate values in each vertex data item in the data structure shown in FIG. 2 are converted to display screen co-ordinates (Sx, Sy) and a Z value indicating a depth in the display screen, as represented by 41A, 42A, 43A in the diagram. This Z value data is used in rendering processing by the rendering section 20, as described previously. The remaining vertex data 41, 42, 43 is the same as in FIG. 2.

When the polygon data illustrated in FIG. 3 is generated by the geometry converting section 14, the attribute classifying section 16 classifies each set of polygon data according to the aforementioned attribute data 40, and stores the data in the polygon buffer memory 18 separately by attribute. The attribute classifying section 16 stores all the polygon data for one frame in the polygon buffer memory 18.

Figure 4:
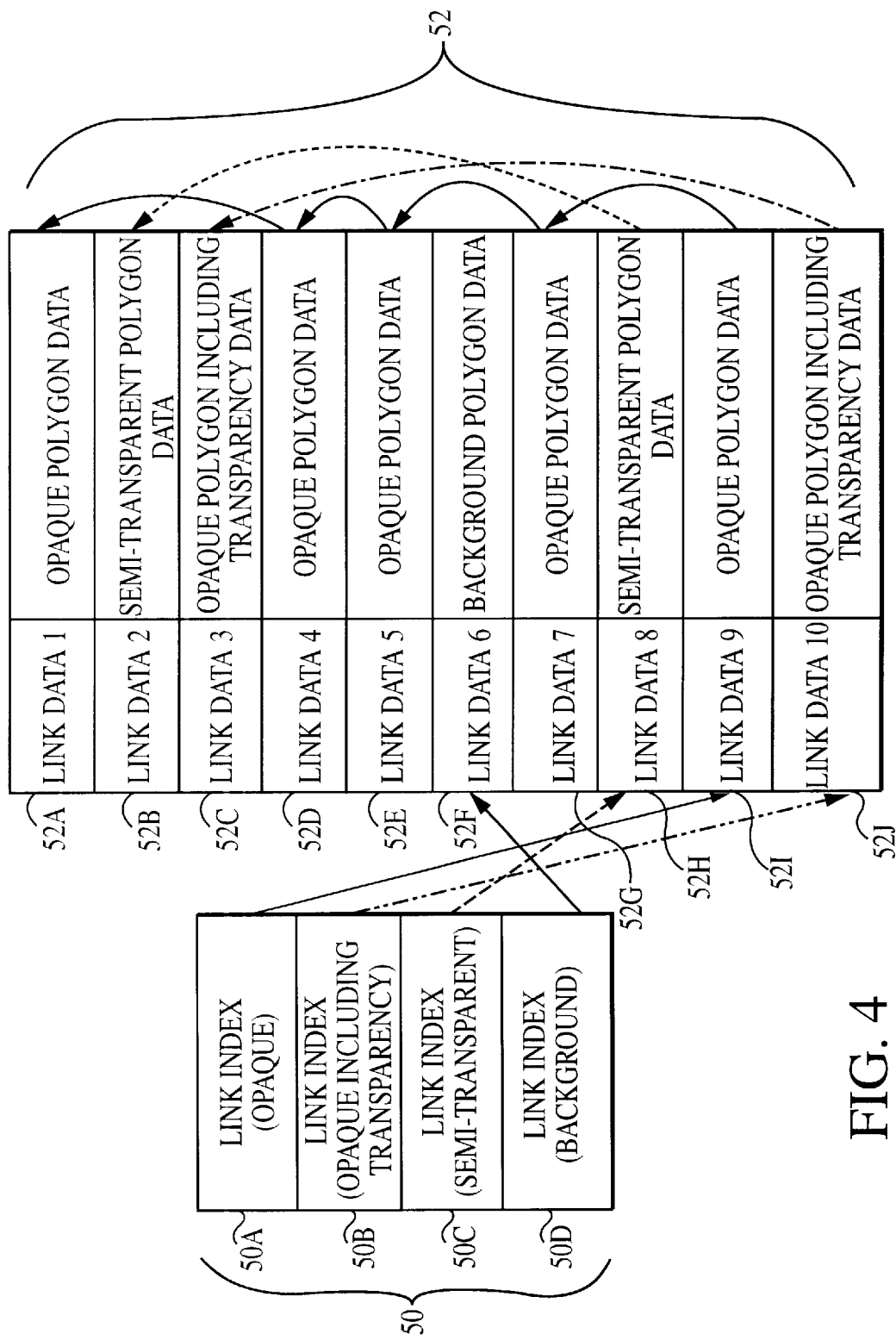
FIG. 4 is a diagram showing an example of a data structure in a polygon buffer memory.

FIG. 4 shows an example of the data structure in the polygon buffer memory. As described above, the polygon buffer memory holds all the polygon data for one frame. The geometry converting section 14 produces the polygon data randomly with respect to the polygon attribute. Therefore, the plurality of polygon data in the polygon buffer memory 18 are linked by pointers. In FIG. 4, link index data for opaque polygons, opaque polygons containing transparent portions, semi-transparent polygons and background polygons is stored in a link index table 50. The polygon data is stored in a polygon data table 52.

In the example in FIG. 4, 10 sets of polygon data are stored in the order 52A, 52B, 52C, . . . 52J. Polygon data belonging to the respective attributes are linked relationally by pointers. Furthermore, the address 52I of the final one of the opaque polygon data sets is stored in region 50A of the link index table 50 as a link index. At the link data region 9 where the data for the opaque polygon registered at address 52I is stored, the address 52G of the preceding opaque polygon data is also stored. Similarly, addresses 52E, 52D, 52A for the respective preceding opaque polygon data are stored in link data regions 7, 5 and 4.

In the same way, the address 52J of the final relational region where data for a opaque polygon containing transparent portions is stored is registered in the link index region 50B corresponding to polygons containing transparent portions, and address 52C of a region storing further data for a polygon containing transparent portions is registered in link data region 10 of this polygon data region, as illustrated by the double-dotted arrow in the diagram. The same applies for semi-transparent polygons: in FIG. 4, two sets of semi-transparent polygon data are stored in the table 52. The same also applies for background polygons.

By adopting the data structure described above, polygon data generated by the geometry converting section 14 is added to the end of a data structure wherein the respective attributes are linked sequentially, and the address of the polygon data added to the end of the data structure is stored in a corresponding region of the link index table 50. The rendering section 20 carries out necessary rendering processing by reading out the linked data in sequence, starting from the end of the data structure. When polygon data has been read out, the address in the link index region is changed to the address where the penultimate polygon data from the end is stored.

Figure 5:
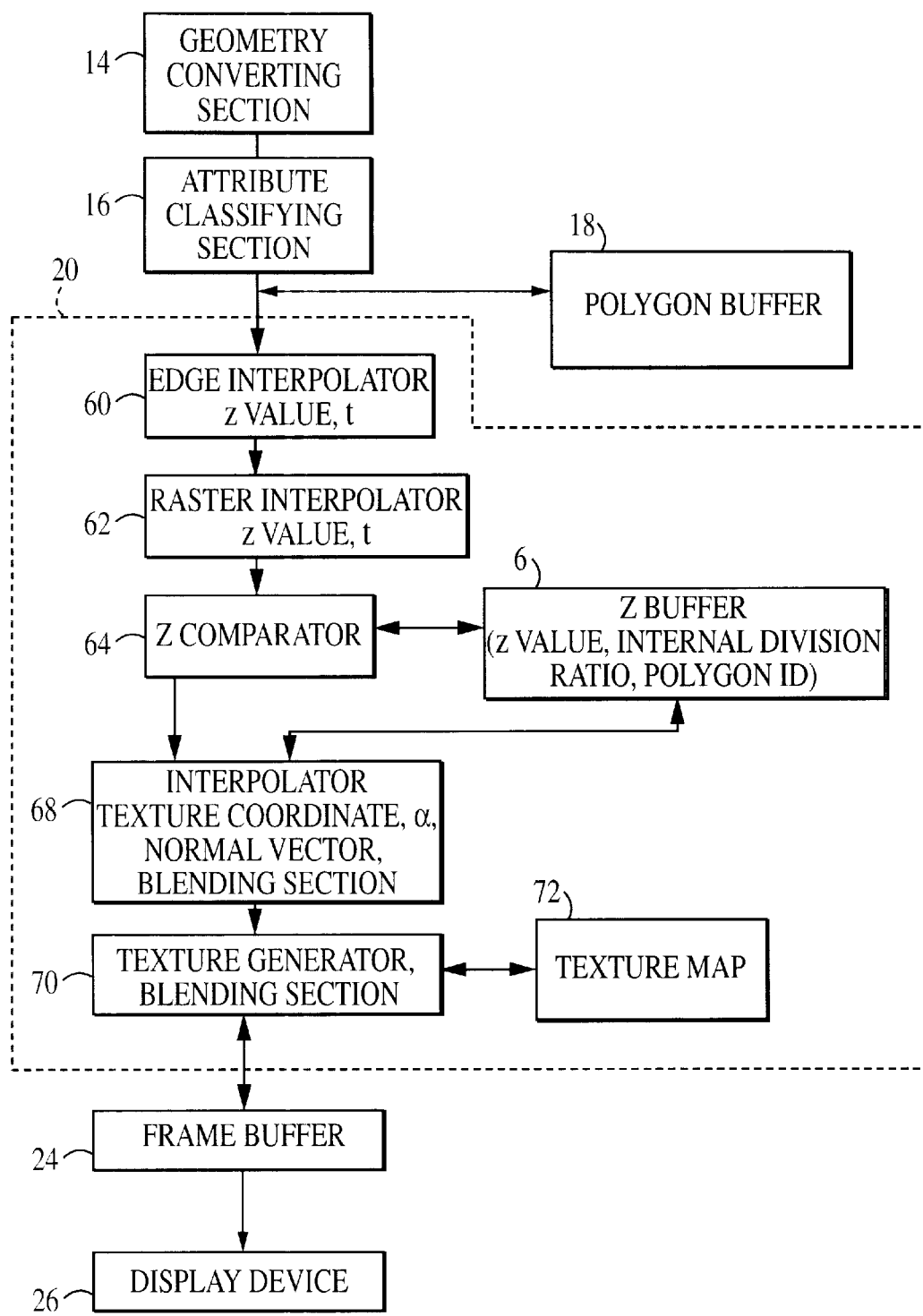
FIG. 5 is a diagram showing a detailed compositional example of a rendering section.
Figure 6:
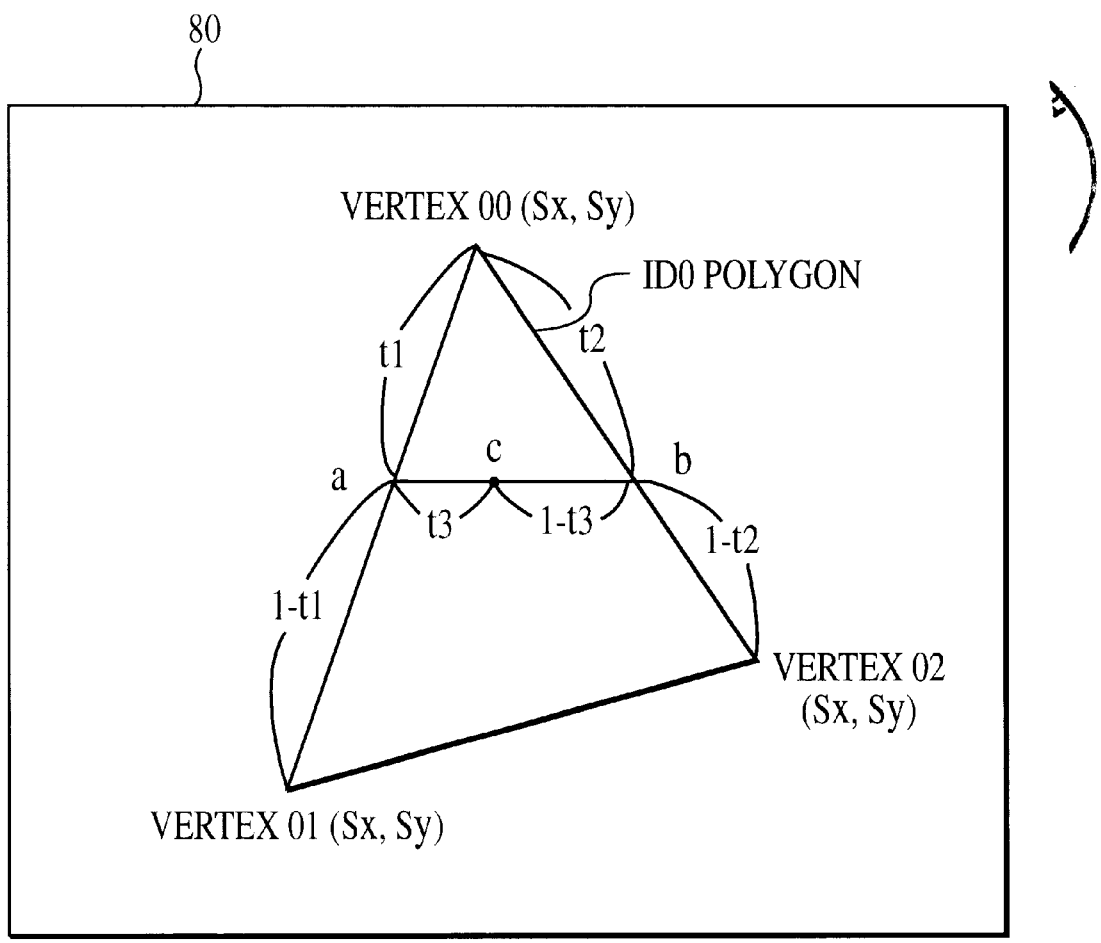
FIG. 6 is a diagram for describing rendering processing, based on the example of a triangular polygon.

FIG. 5 shows an example of the detailed composition of the rendering section 20. FIG. 6 is a diagram for describing a rendering process, using a triangular polygon as an example. As shown in FIG. 5, the rendering process comprises the processes of: scanning the pixels in a polygon in the X, Y directions, for instance, and determining data corresponding to the pixel by interpolation from vertex data, for each respective pixel; comparing the Z value for the pixel determined by interpolation with the Z value for an already processed pixel in the Z value buffer memory in order to determine whether or not it is positioned in front of that pixel in the screen; and calculating colour data in accordance with texture co-ordinates data, normal vector data, an alpha value representing transparency, and the like, determined by interpolation, if the pixel is positioned to the front of the screen.

In FIG. 5, the aforementioned interpolation processes are carried out by an edge interpolator 60 and raster interpolator 62. Here, we shall consider the rendering process of polygon ID 0 in a screen 80, as illustrated in FIG. 6, and we shall look at the processing for a pixel at point c in the polygon. In order to determine the Z value of the pixel corresponding to point c, an internal division ratio t1 at point a on edge 00–01, and an internal division ratio t2 at point b on edge 00–02 are determined. These are edge interpolation calculations. A further internal division ratio t3 is determined at point c which lies between points a and b. This is a raster interpolation calculation. Thereupon, the Z value at point c is derived by a linear interpolation method from the Z values at each of the vertices, for example.

The Z value derived in this way is supplied to the Z value comparator 64. The Z value for a pixel which is in a screen position in front of a pixel in an already processed polygon will be stored in the Z value buffer memory 66. Therefore, the Z value comparator 64 compares the Z value determined by interpolation and the Z value for a corresponding pixel in the Z value buffer memory 66.

When the Z value of the pixel under processing is smaller, colour data is calculated for that pixel by means of the interpolator 68, and the texture generating section and blending section 70. Using the internal division ratios t1, t2, t3 determined by the aforementioned edge interpolation and raster interpolation, the interpolator 68 derives texture co-ordinate values, normal vectors and an alpha value for the pixel under processing, point c, by a similar direct interpolation process, from the texture co-ordinates values, normal vectors and alpha values in the vertex data. This interpolation process can be carried out simultaneously with the Z value interpolation.

Texture data representing pattern data for each polygon is stored in a texture map memory 72. The texture co-ordinates in the aforementioned vertex data correspond to an address in the texture map memory 72. Therefore, the texture generating section and blending section 70 reads out colour data in the texture map memory 72 in accordance with the texture co-ordinates derived by interpolation. Furthermore, the texture generating section and blending section 70 also implements processing for achieving special effects, for instance, it processes the colour data in accordance with the normal vectors to correct the luminosity with respect to the light source, and it blends colour data for a polygon positioned behind the pixel depending on the alpha value representing transparency. To conduct this processing, the texture generating section and the blending section 70 reads out colour data stored in the frame buffer memory 24, and stores the processed colour data back in the frame buffer memory. This special processing also includes depth cue processing, and the like, which is described later.

Figure 7:
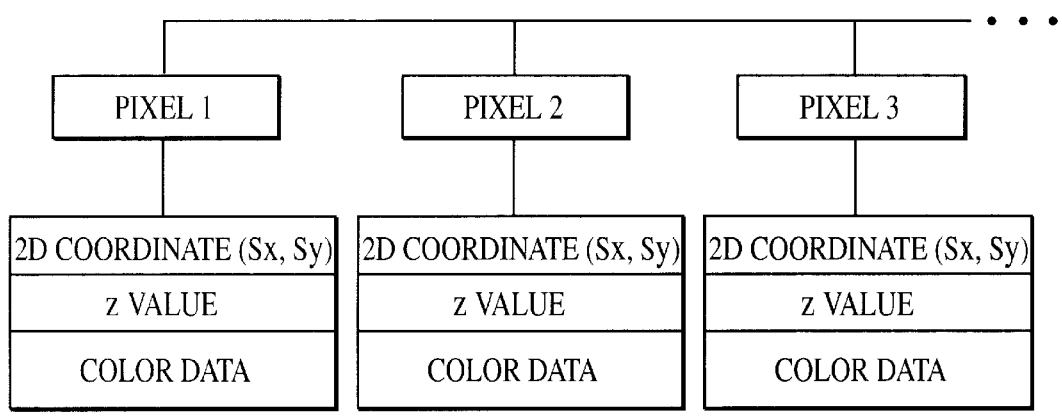
FIG. 7 is a diagram for showing an example of the composition of data generated by a rendering section.

FIG. 7 shows an example of data composition generated by the rendering section 20. As the foregoing description reveals, Z values and colour data are determined for pixels in polygons which are positioned foremost in the display screen. Therefore, at the least, the derived Z value and colour data are stored in the pixel region of the Z value buffer memory 66 and frame buffer memory 24 corresponding to the display screen co-ordinates (Sx, Sy).

Semi-transparent polygon and opaque polygon

In order to display a semi-transparent polygon more realistically, it is necessary to carry out processing for blending with the colour of the polygon positioned behind it. In order to implement this blending process, firstly, the polygon positioned behind in the screen is rendered, whereupon, when rendering the semi-transparent polygon positioned in front of this polygon, the colour data for the polygon already processed and the colour data for the semi-transparent polygon under processing are blended.

Figure 8:
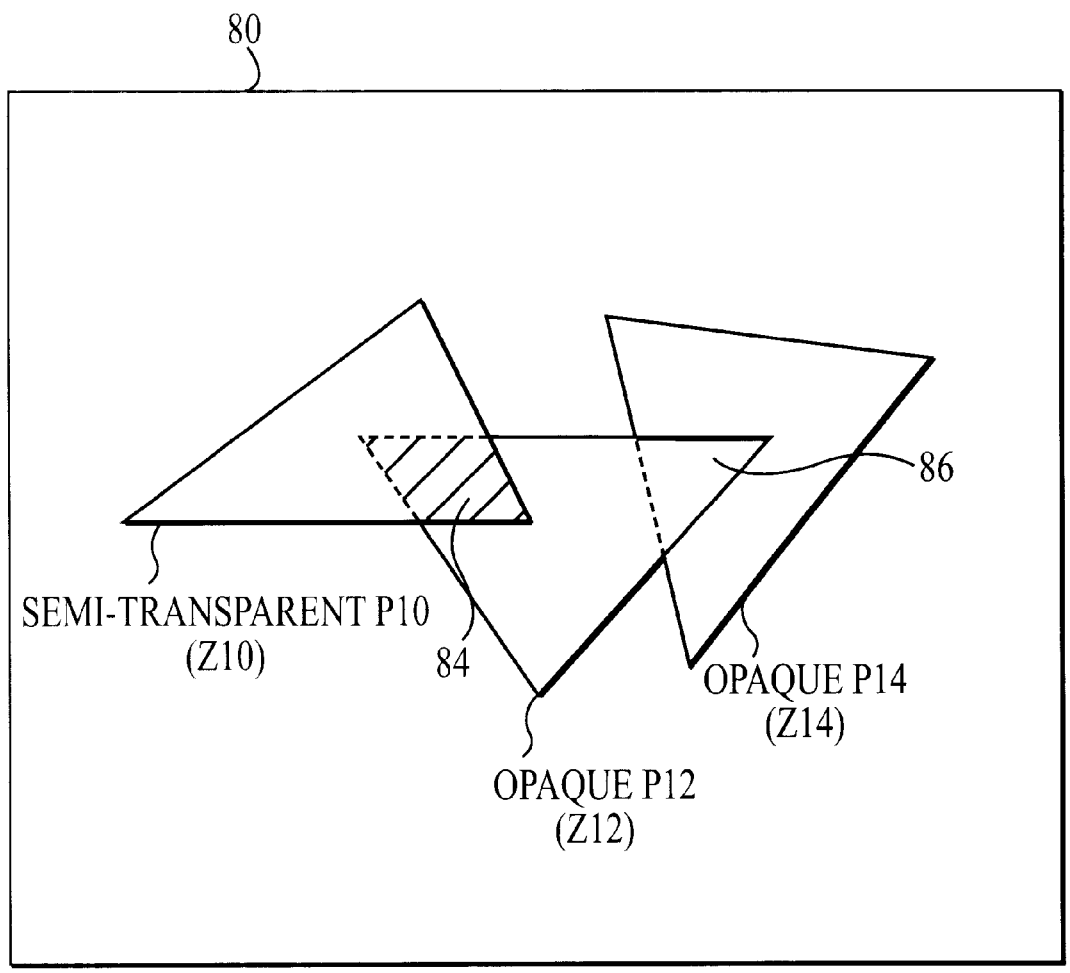
FIG. 8 is a diagram illustrating a case where a display screen contains, in order from the front of the screen, a semi-transparent polygon, an opaque polygon, and an opaque polygon.

FIG. 8 shows a case where a display screen 80 contains, in order from the front of the screen, a semi-transparent polygon P10, an opaque polygon P12, and an opaque polygon P14. Therefore, the relationship between the respective Z values is Z10<Z12<Z14. In this case, it is necessary to conduct blending processing in the region 84 where the semi-transparent polygon P10 and the opaque polygon P12 overlap with each other. In the region 86 where the opaque polygons P12 and P14 overlap, the Z values of the two polygons are compared, and the pixels with the lower Z value should be stored in the frame buffer memory. Therefore, processing between opaque polygons can be conducted as normal by Z value comparison using the Z value buffer memory.

Therefore, in the present embodiment, rendering of opaque polygons is given priority, and rendering of semi-transparent polygons is conducted subsequently.

Figure 9:
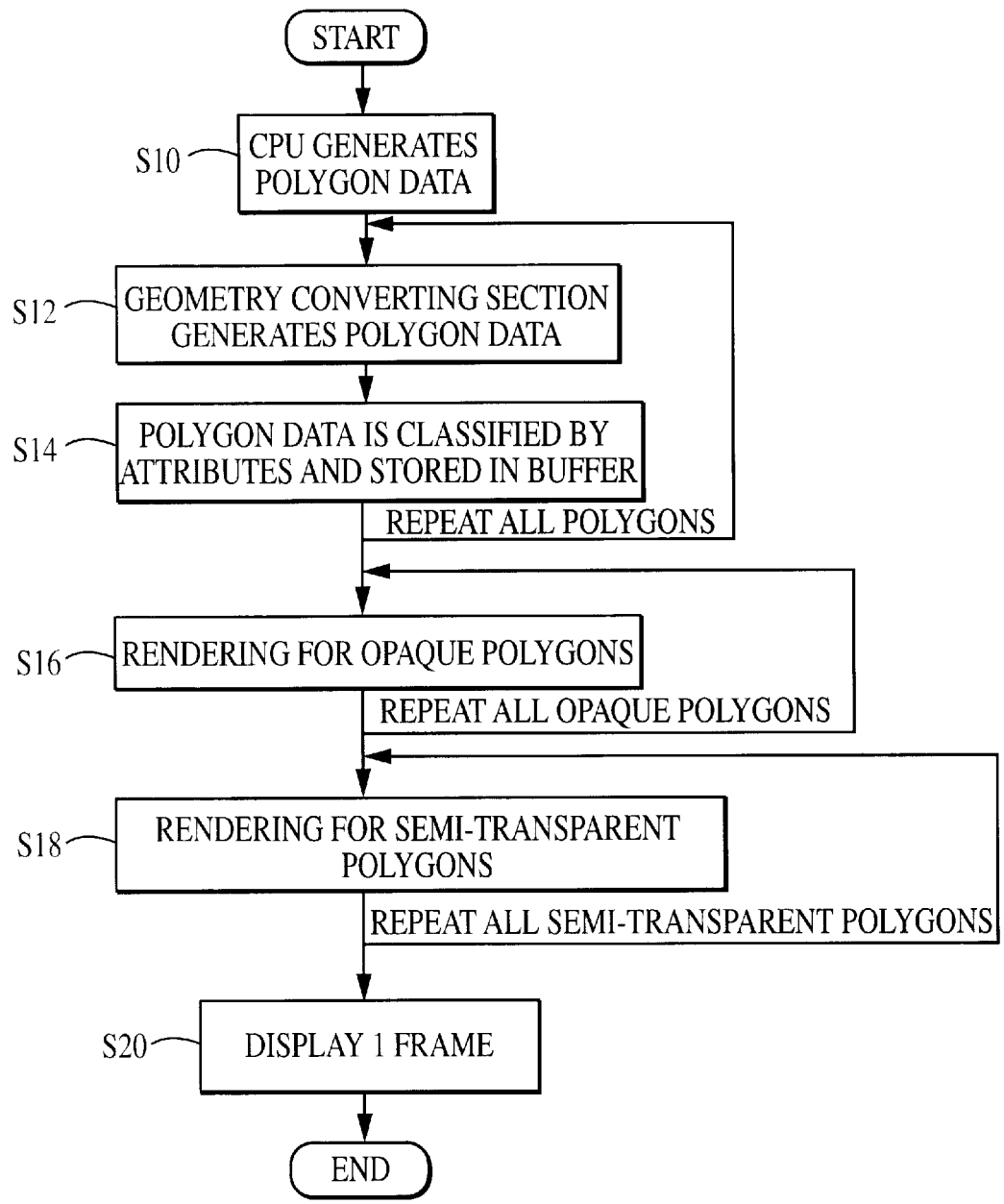
FIG. 9 is a flowchart of image processing in a case where both a semi-transparent polygon and an opaque polygon are present.

FIG. 9 is a flowchart of image processing in a case where a semi-transparent polygon and an opaque polygon are included in a screen. Firstly, the CPU 10 calculates the polygons forming the object to be displayed in accordance with a game program or simulation program, and polygon data is generated as shown in FIG. 2 (S10). The geometry converting section 14 then performs geometry conversion processing as described above, to produce polygon data as illustrated in FIG. 3 (S12). This polygon data is classified by the attribute classifying section 16 into opaque polygons and semi-transparent polygons, and it is stored in the polygon buffer memory 18 (S14). Steps S12 and S14 are implemented for all the polygons in a single frame.

Thereupon, rendering is carried out first for the opaque polygons (S16). As stated previously, this rendering process involves determining the Z values of the pixels in the polygon by interpolation of the Z values in the vertex data, comparing these Z values with Z values in the Z value buffer memory by means of a Z value comparator, calculating colour data for the pixel, if it has the smaller Z value, and writing this calculated colour data to the frame buffer memory. The rendering in this step S16 is carried out for all the opaque polygons in a frame.

Next, rendering is conducted for the semi-transparent polygons (S18). In this rendering process also, basically, purposeless calculation of colour data is avoided as far as possible by comparing Z values, and ultimately, colour data for the pixels in the polygon having the smallest Z value is stored in the frame buffer memory. When a semi-transparent polygon is rendered, a process of blending the colour data of the polygon positioned behind it with the colour data for pixels in the polygon under processing, in accordance with the corresponding alpha value, is implemented as a special process. When this semi-transparent polygon rendering process is completed, one frame is displayed (S20).

Figure 10:
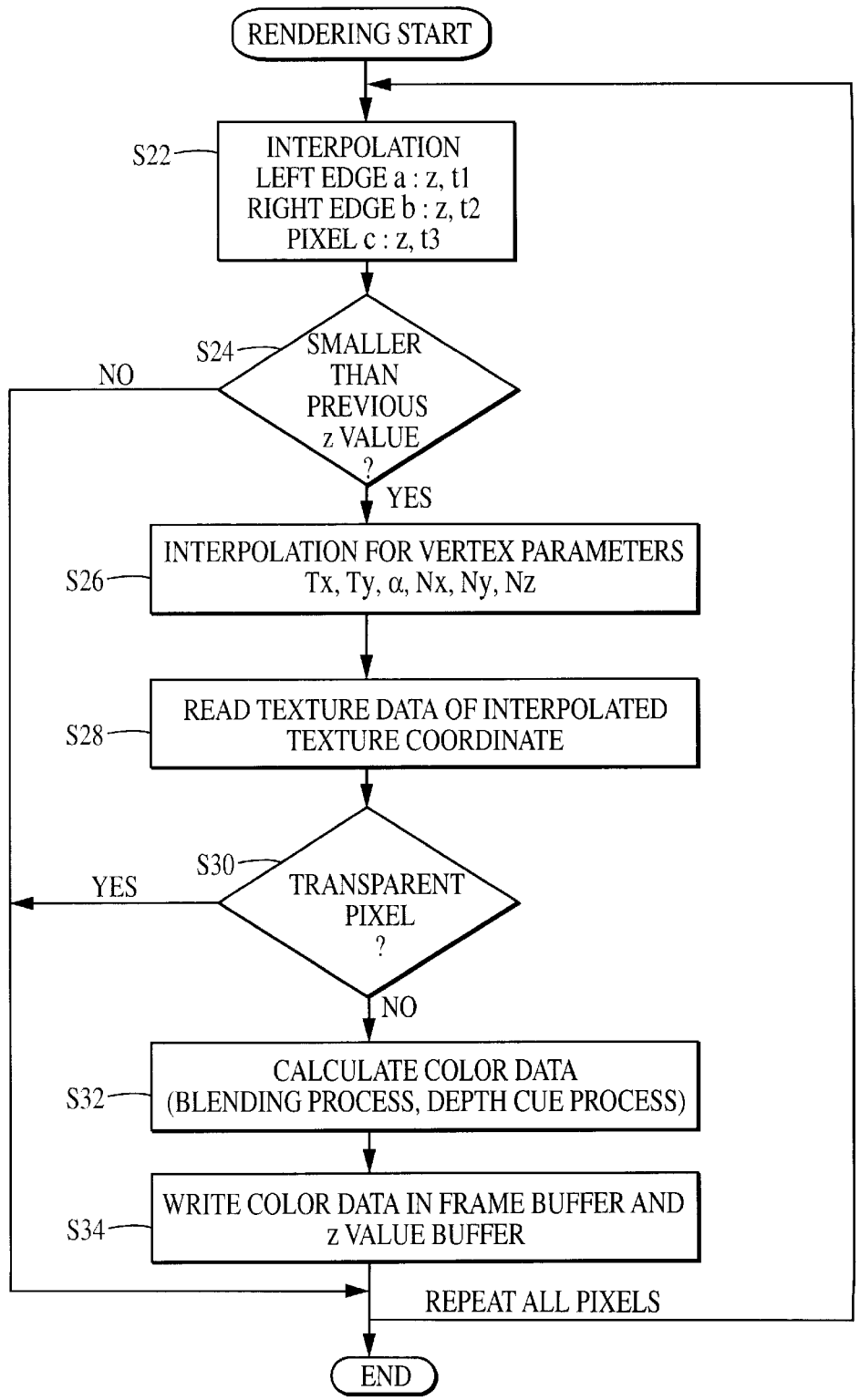
FIG. 10 is a diagram showing an example of a flowchart for rendering processing.

FIG. 10 shows an example of a flowchart of a rendering process. Firstly, the Z value of a pixel in a polygon is derived by interpolation from the Z values in the vertex data for the polygon (S22). This interpolation process is as described in FIG. 6. The derived Z value of the pixel is then compared with a corresponding z value stored in the Z value buffer memory (S24). If the Z value of the pixel under processing is larger than the Z value in the buffer memory, then this means that the pixel is behind another polygon positioned in front of it in the screen, and therefore it does not need to be drawn. Accordingly, no further rendering processing is carried out for this pixel.

If the Z value of the pixel under processing is smaller, then the texture co-ordinates (Tx, Ty), alpha value indicating transparency, and normal vectors (Nx, Ny, Nz) in the vertex data are interpolated using the internal division ratios t1, t2, t3 determined in step S22, to derive texture co-ordinates, an alpha value, and normal vectors for the pixel (S26). Colour data is read out from the texture map memory in accordance with the texture co-ordinates determined in the interpolation process (S28).

The flowchart in FIG. 10 also includes rendering processing for opaque polygons containing transparent portions, and therefore, the processing in step 30 is also included. However, in a rendering process for semi-transparent polygons and opaque polygons, there are no transparent pixels, so the routine proceeds to step S32.

In the case of an opaque polygon, the colour data read out from the texture map memory is subjected to correctional processing to correct, for instance, the luminosity depending on the light source, using the normal vectors (S32). In the case of a semi-transparent polygon, the colour data read out from the texture map memory and the colour data in the frame buffer memory are subjected to a blending process in accordance with the alpha value for the polygon. Luminosity correction for the light source, using the normal vectors, may also be implemented. Finally, the resulting colour data is stored in a frame buffer memory, whilst the polygon Z value is stored simultaneously in a Z value buffer memory (S34).

The processing described above is repeated for all the pixels in a polygon by raster scanning.

In this way, by giving priority to rendering of opaque polygons, it is possible to carry out rendering of semi-transparent polygons reliably. Furthermore, since calculation of useless colour data is avoided by using Z values, the rendering processes can be conducted efficiently. By adopting a rendering process using Z values, rendering processing to determine colour data for opaque polygons and semi-transparent polygons having a large Z value can be omitted. Opaque polygon containing transparent portions and opaque polygon 'Polygon' means a multiple-sided shape, and in image processing using a computer, polygons generally have a simple shape, such as a triangle. One reason for this is that it simplifies the algorithms used for raster scanning of the polygon. Therefore, in order to process an object which does not accord with this shape as polygon data, a polygon containing transparent portions is used.

Figure 11A:
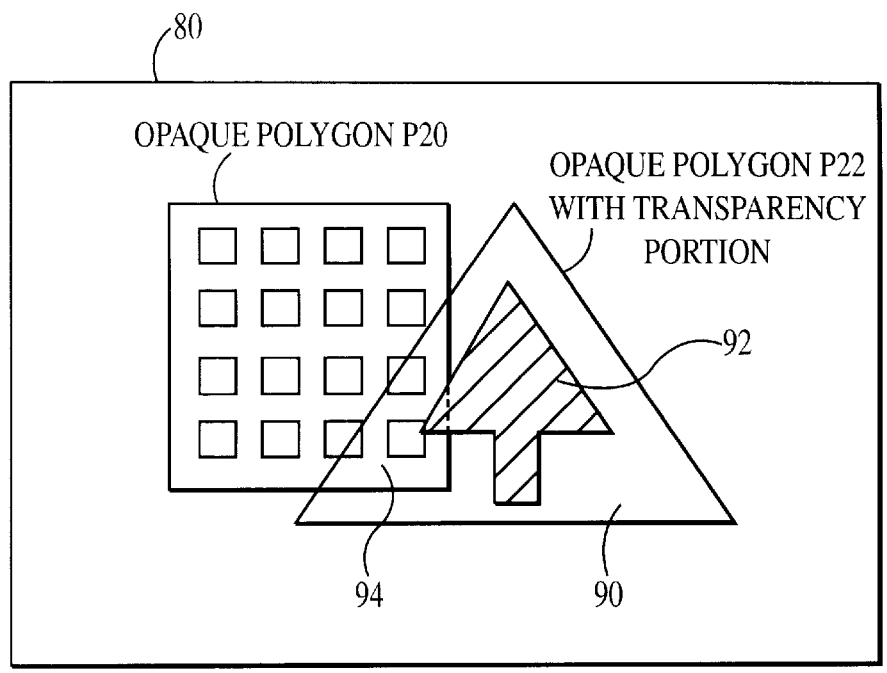
FIG. 11 shows diagrams illustrating a case where an opaque polygon containing transparent portions and an opaque polygon are displayed in a display screen.

FIG. 11 illustrates a case where an opaque polygon containing transparent portions and an opaque polygon are displayed on a display screen 80. FIG. 11A shows a case where an opaque polygon P20 is positioned behind an opaque polygon containing transparent portions P22 in the display screen 80. The opaque polygon P20 is, for example, an object representing a certain building, and the polygon containing transparent portions P22 is an object representing a tree. The polygon containing transparent portions P22 has a triangular shape, and the texture data representing its pattern contains an opaque portion 92 comprising the tree pattern, and a transparent portion 90 surrounding this pattern. Therefore, in the region 94 where the two polygons P20 and P22 overlap with each other, colour data for the transparent region of the polygon P22 is not written to the frame buffer memory, and the colour data of the polygon P20 positioned behind it is retained in the memory. Furthermore, the Z value of polygon P20 is also retained in the Z value buffer memory.

Figure 11B:
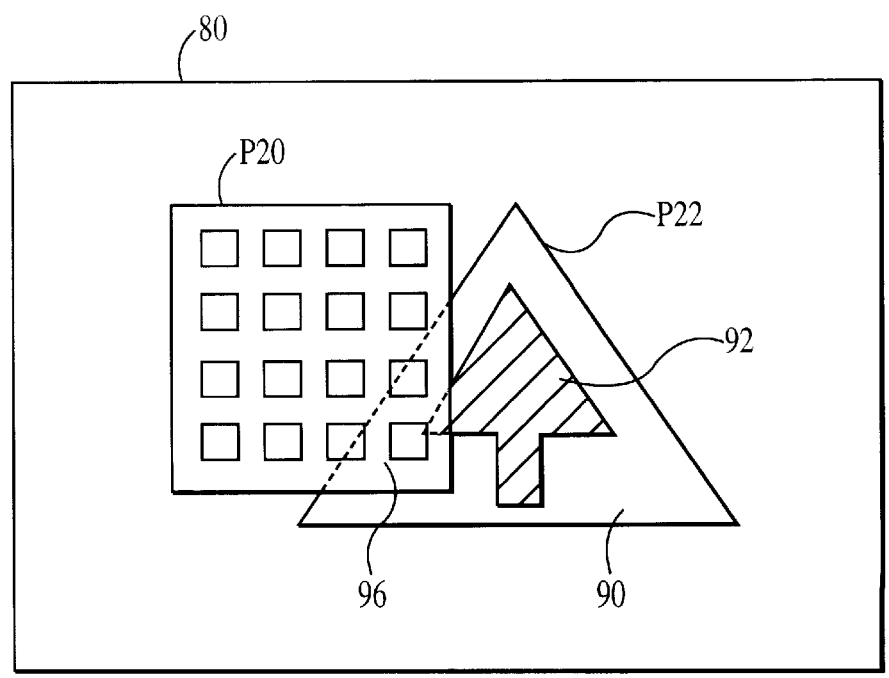

FIG. 11B illustrates a case where an opaque polygon containing transparent portions P22 is positioned between an opaque polygon P20 in a display screen 80. Here, in the region 96 where the two polygons overlap with each other, only the colour data for polygon P20, which has a smaller Z value, is written to the frame buffer memory.

When processing the opaque polygon containing transparent portions, firstly, texture data is read out to determine whether or not the pixel in polygon P22 is transparent. Namely, as described previously, if the rendering process is divided into a step of calculating Z values, followed by a step of calculating texture co-ordinates, reading out the colour data and calculating colour data, then in order to judge whether or not a pixel is transparent, it is necessary to conduct the rendering process from Z value calculation and texture co-ordinates calculation up to the step of reading out the colour data. However, in the overlapping region 96, as shown in FIG. 11B, the Z value is calculated for the polygon containing transparent portions P22, and if this Z value is judged to be greater than the Z value of polygon P20, no further rendering processing is necessary.

Consequently, in order to conduct the rendering process efficiently, desirably, the opaque polygon is rendered first, and then the opaque polygon containing transparent portions is rendered. By adopting this method, in the overlapping region 94 in FIG. 11A, processing from Z value calculation up to reading out of colour data should be conducted for the pixels in polygon P22, but in the overlapping region 96 in FIG. 11B, it is necessary simply to calculate and compare the Z values for the pixels in polygon P22.

This relationship also applies similarly between semi-transparent polygons containing transparent portions and opaque polygons. In other words, semi-transparent polygons containing transparent portions should be rendered after opaque polygons. The same relationship also applies between semi-transparent polygons containing transparent portions and semi-transparent polygons. In other words, with polygons containing transparent portions and polygons not containing transparent portions, it is appropriate to process the polygons not containing transparent portions before processing the polygons containing transparent portions.

Figure 12:
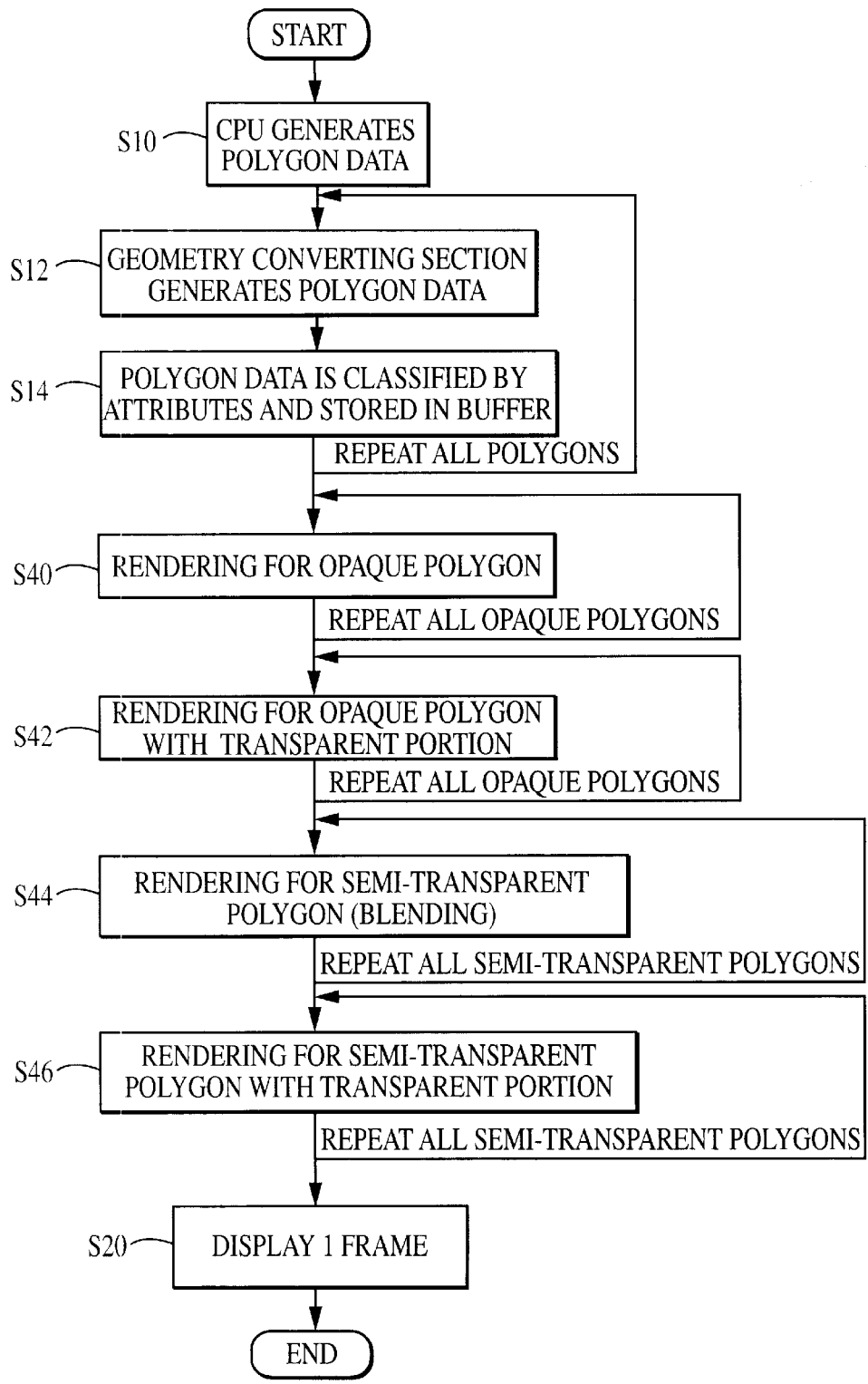
FIG. 12 is an image processing flowchart in a case where both polygons containing transparent portions and polygons not containing transparent portions are present.

FIG. 12 is a flowchart of image processing in a case where both polygons containing transparent portions and polygons not containing transparent portions are present. Steps S10, 12 and 14 are the same as in the flowchart in FIG. 9. Therefore, the polygon data in one frame is classified according to its attributes and stored in a polygon buffer memory. Thereupon, rendering is carried out initially for the opaque polygons not containing transparent portions (S40). Next, the opaque polygons containing transparent portions are rendered (S42). Thereupon, the semi-transparent polygons not containing transparent portions are rendered (S44), and finally, the semi-transparent containing transparent portions are rendered (S46).

other words, the opaque polygons are processed first at steps 40, 42 and the semi-transparent polygons are then processed at steps 44, 46. Thereby, the blending processing for the semi-transparent polygons is carried out reliably. Moreover, the respective processes for opaque polygons and semi-transparent polygons are carried out firstly for polygons not containing transparent portions and then for polygons containing transparent portions. By this means, it is possible to reduce as far as possible the processing conducted for transparent pixels which are first discovered when their texture data is read out.

The rendering processes in steps S40, S42, S44 and S46 in FIG. 12 are carried out in accordance with the flowchart in FIG. 10. In the case of a polygon containing transparent portions, at the stage where texture data is read out from the texture map memory in accordance with the texture co-ordinates at step S28, it is discovered that a pixel is transparent (S30), and further calculation processing of the colour data is halted.

In the case of FIG. 11A, since rendering is conducted first for the opaque polygon P20, the rendering of the transparent portion of the polygon containing transparent portions P22 is implemented up to step S30 in FIG. 10. However, in the case of FIG. 11B, the rendering of the overlapping region 96 of the polygon containing transparent portions P22 is only implemented up to step S24 in FIG. 10.

If the polygon containing transparent portions P22 was rendered first, in the case of 11B, the rendering process for the polygon containing transparent portions P22 would be implemented up to step 30 in FIG. 10, and therefore the processing in steps S26, S28 and S30 would be wasted.

Background polygon and other polygon

In image processing, the practice of implementing depth cue processing, whereby the colour of a polygon positioned in the far distance in the display screen is blended with a background colour in order to create a more realistic display, is already known. This is because if polygons located in the far distance are displayed too clearly, an unnatural sense of depth is created. Therefore, the colour of the polygon is mixed with the colour of the background to create a type of shading, and this is called a depth cue effect.

Figure 13:
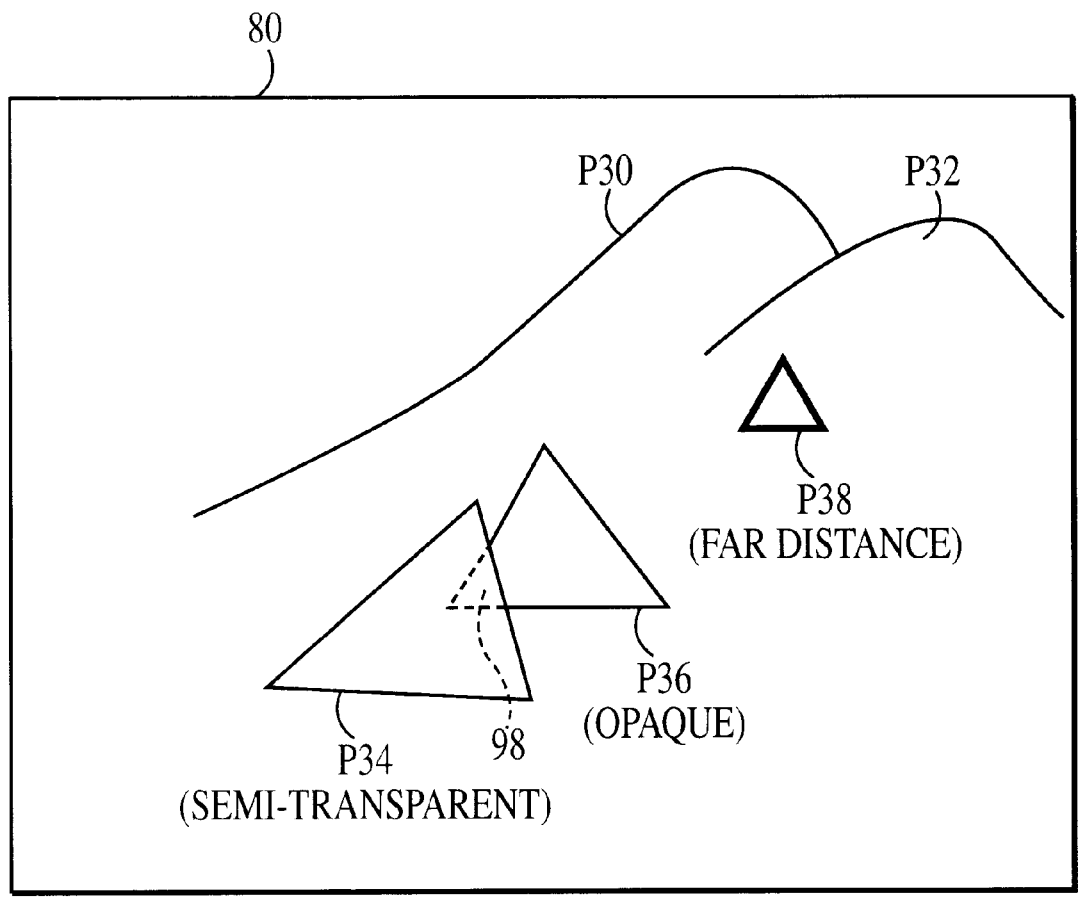
FIG. 13 is a diagram illustrating the relationship between background polygons and other polygons.

FIG. 13 shows the relationship between background polygons and another polygon. In this example, background polygons P30 and P32, representing mountain objects, are mixed with a semi-transparent polygon P34, an opaque polygon P36, and a polygon P38 located in the far distance. Here, the polygon P38 located in the far distance is depth cue processed with the colour data for the background polygon P32. In depth cue processing, if the Z value for a polygon being drawn is large, it is judged that it is positioned in the far distance, and blending with the colour data of a background polygon is carried out in accordance with the Z value.

However, if all the pixels in the background polygons are rendered, then if another polygon is positioned on top of these polygons, the rendering of the background polygons in this overlapping region will be wasted processing.

Bearing this point in mind, firstly, by appending a background polygon attribute to the polygon data and conducting the rendering process for the background polygons separately from the other polygons, it is possible to simplify special processing, such as depth cue processing. Furthermore, secondly, by conducting the rendering process for the background polygons as late as possible, is it possible to eliminate wasted rendering processing.

Figure 14:
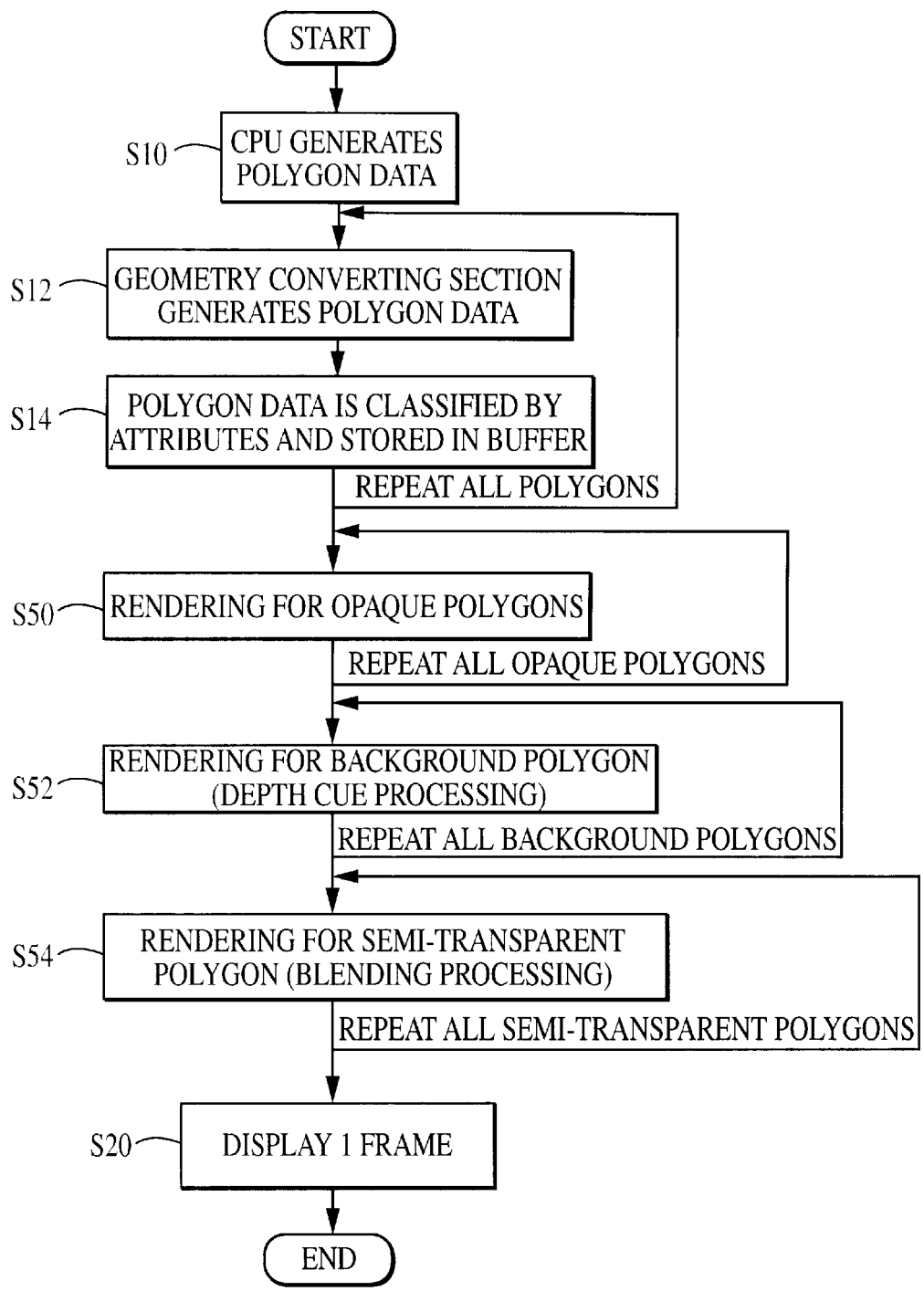
FIG. 14 is a flowchart of image processing in a case where background polygons, opaque polygons and semi-transparent polygons are all present.

FIG. 14 is a flowchart of image processing in a case where background polygons, opaque polygons and semi-transparent polygons are all present. Up to steps S10, S12, S14, the routine is the same as the foregoing. Here, at step S14, the polygons are classified into background polygons, opaque polygons and semi-transparent polygons, and they are stored in the polygon buffer memory 18. Thereupon, the rendering process is conducted firstly for the opaque polygons (S50), then the background polygons (S52), and finally for the semi-transparent polygons (S54).

In this example, as described in FIG. 9, rendering for the semi-transparent polygons is conducted after rendering of opaque polygons and background polygons which may be positioned behind them. The background polygons are all rendered together, and this rendering is carried out after processing the opaque polygons. In rendering the opaque polygons and the semi-transparent polygons, colour data generation, and the like, is only carried out for pixels which are judged to be positioned foremost by comparing Z values. Moreover, the aforementioned blending processing is implemented for semi-transparent polygons in regions where they overlap with other polygons. In FIG. 13, this relates to the rendering of region 98.

Figure 15:
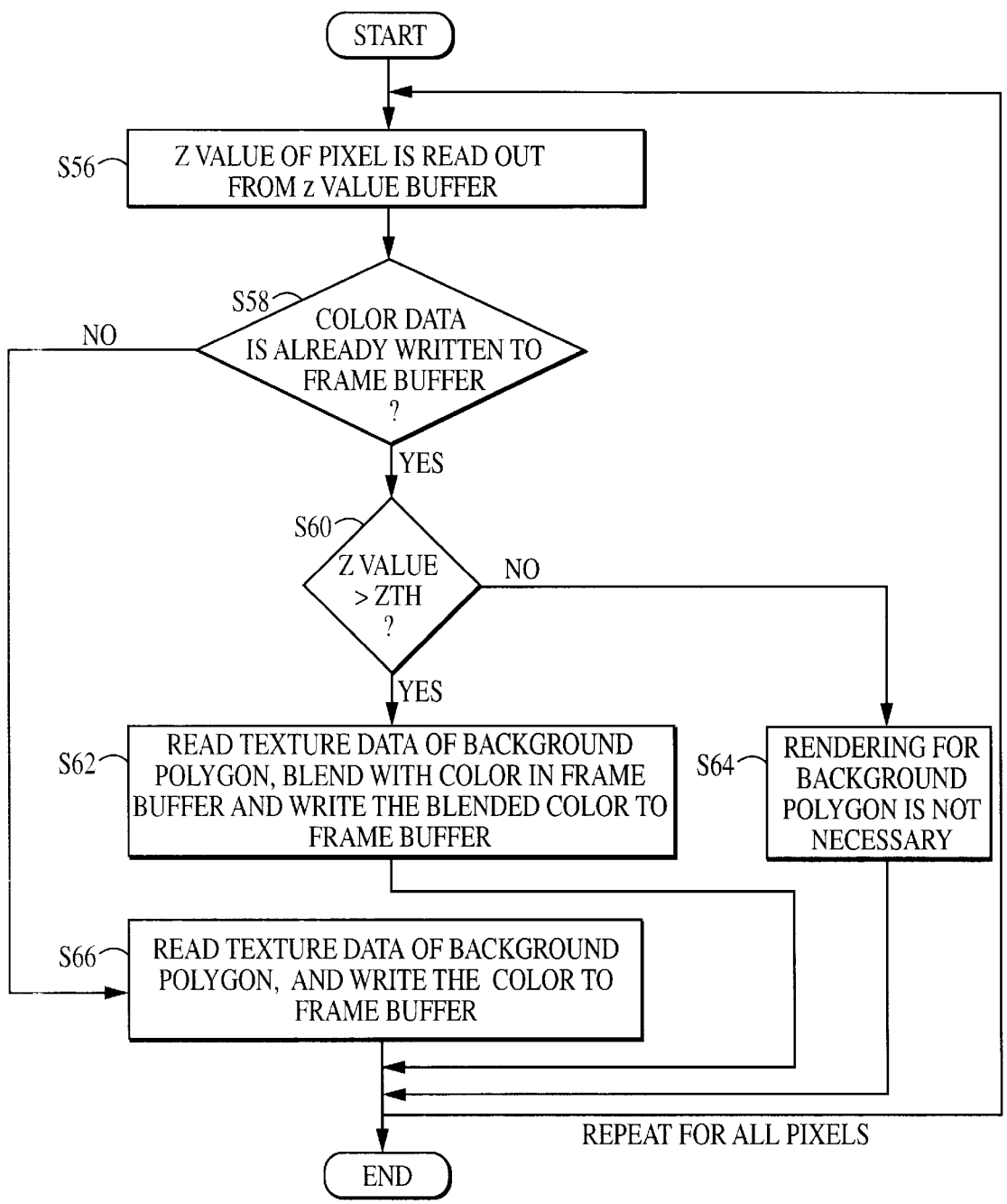
FIG. 15 is a detailed flowchart of rendering processing of background polygons implemented at step S52 in FIG. 14.

FIG. 15 is a detailed flowchart of a rendering process for background polygons in step S52 in FIG. 14. Background polygon data is read out from the polygon buffer memory. The Z values of pixels inside the polygon set by raster scanning are then derived by interpolation. At the same time, the Z value in the Z value buffer memory corresponding to that pixel is read out and it is judged whether or not colour data has already been written to the frame buffer memory for that pixel (S56, S58). If data has already been written, then it is judged whether or not the Z value for the pixel already written is greater than a threshold value Zth (S60). If the Z value is greater than this threshold value Zth, then it is judged that the corresponding polygon is positioned in the far distance. Therefore, texture data for the pixel in the background polygon is read out, and it is blended with the colour data written to the frame buffer memory. This is called depth cue processing. This blended colour data is written again to the frame buffer memory (S62).

If the Z value is less than the threshold value Zth, then the polygon is not positioned in the far distance, and depth cue processing becomes unnecessary. Moreover, since the pixel in the corresponding background polygon is positioned behind the polygon already written to the memory, subsequent rendering thereof is unnecessary (S64).

On the other hand, if at step S58 no colour data of any kind has been written for the pixel in the background polygon, then texture data is read out from the texture map memory and it is written to the frame buffer memory (S66).

In this way, since rendering is carried out for all the background polygons together, it is possible to carry out this processing following the flowchart in FIG. 15, which is specially designed for background polygons. Using this specially designed routine means that efficiency can be raised.

Figure 16:
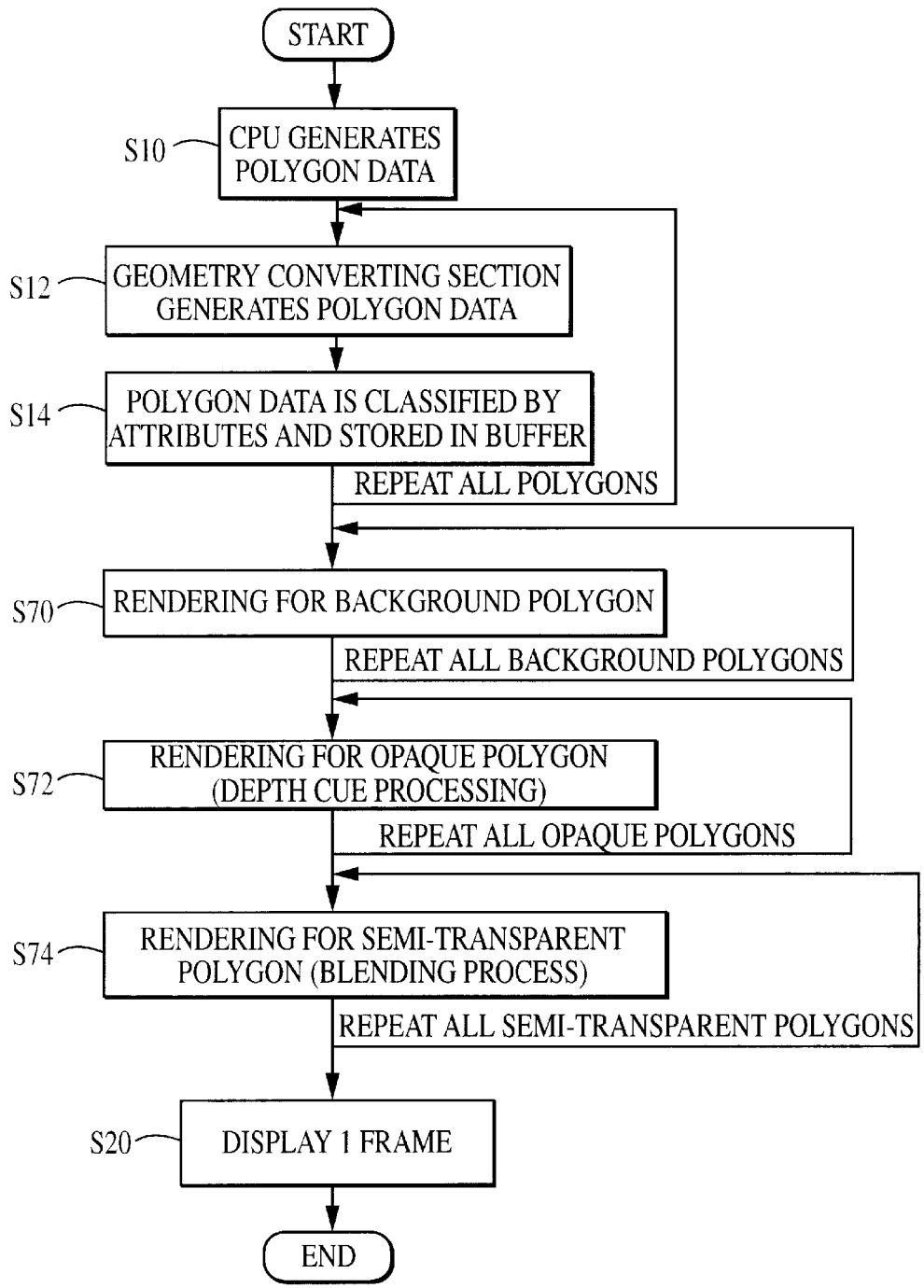
FIG. 16 is a flowchart of a second image processing method, in a case where background polygons, opaque polygons and semi-transparent polygons are all present.

FIG. 16 is a flowchart of a second image processing method in a case where background polygons, opaque polygons and semi-transparent polygons are all present. Up to steps S10, S12 and S14, the routine is the same as in FIGS. 12 and 14 above. In this example, at step S14, the polygons are divided into background polygons, opaque polygons and semi-transparent polygons, and they are stored in the polygon buffer memory 18. Thereupon, rendering is carried out firstly for the background polygons (S70), then for the opaque polygons (S72), and finally for the semi-transparent polygons (S74).

In other words, in this example, the background polygons are all rendered first, and then the other polygons are rendered in the order: opaque polygons followed by semi-transparent polygons. In the rendering process for the opaque polygons, if the Z value exceeds a threshold value Zth, then depth cue processing for blending the colour data of a background polygon in the frame buffer memory is implemented. Furthermore, in the rendering of semi-transparent polygons, processing for blending colour data positioned behind the polygon is implemented in the overlapping regions, and if the Z value of the polygon exceeds a threshold value Zth, depth cue processing is also carried out as above.

Figure 17:
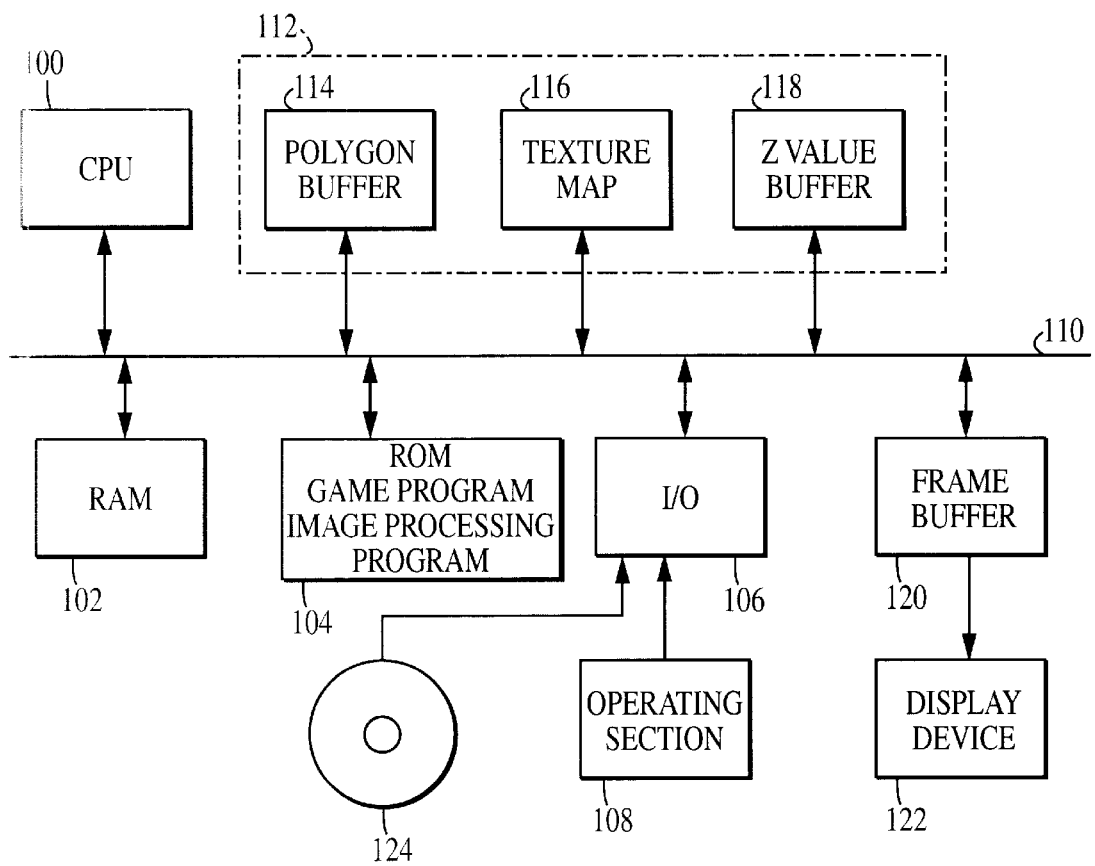
FIG. 17 is a compositional diagram of an image processing device in a case where image processing is carried out using a generic computer.

FIG. 17 is a compositional diagram of an image processing device in a case where a generic computer is used to carry out the image processing described thus far. When a generic computer is used for image processing, it performs image processing calculations in accordance with a program stored on a storage medium. Therefore, by storing image processing programs on a computer-readable storage medium, a generic computer can be made to operate as a dedicated image processing computer.

In the example in FIG. 17, a CPU 100, RAM 102 for calculating operations, and a ROM 104 for storing game programs or image processing programs are connected to a bus 110. An input/output section 106 connected to this bus 110 is further connected to an operating section 108 controlled by the operator, and it inputs operating signals. In order to conduct image processing, a polygon buffer memory 114, texture map memory 116, and a Z value buffer memory 118 are provided in a further RAM 112, and they are each connected respectively to the bus 110. A frame buffer memory 120 is also connected to the bus 110, and to an external display device 122.

In this example, the image processing program is stored in a ROM 104, and apart from this, it is also possible to install image processing programs from a recording medium, such as an external CDROM, magnetic tape, etc., to the RAM 102.

As described above, according to the present invention, since polygons are classified by attribute and rendering is carried out for all polygons having the same attribute together, in accordance with prescribed priority rules, it is possible to carry out special processing associated with rendering processing simply and reliably.

Moreover, by taking the efficiency of processing as well as the reliability of processing into account when setting the prescribed priority rules, it is possible to raise the efficiency of the rendering process as a whole.

What is claimed is:

1. An image processing device for generating image data by conducting rendering for a plurality of polygons, said image processing device comprising:

a polygon data generating section for generating polygon data containing, at the least, two-dimensional co-ordinates in a display screen, a Z value (depth value) indicating a depth in the display screen, and attribute data indicating the type of polygon, for polygons positioned in a display screen, said attribute data including a semi-transparent polygon, an opaque polygon, a polygon containing transparency portion, and a polygon not containing transparency portion;

a polygon buffer memory for storing said polygon data, said polygon data to be stored separately according to said attribute data; and a rendering section, which is supplied with said polygon data in a prescribed order of priority of said attribute data and generates said image data for pixels in said polygons from said polygon data, wherein said prescribe order is set such that the generation of the image data for pixels in the polygons is carried out for the semi-transparent polygon after the opaque polygon, and is carried out for the polygon containing transparency portion after the polygon not containing transparency portion.

2. The image processing device according to claim 1, wherein:

in the rendering process for said semi-transparent polygons, said rendering section carries out processing for blending the colour data of semi-transparent pixels in said semi-transparent polygons with the colour data of polygons positioned behind said semi-transparent polygons.

3. The image processing device according to claim 1, wherein:

in the rendering process for said polygons containing transparency portion, said rendering section does not carry out rendering processing for a pixel in a polygon containing transparency portion, if said pixel in said polygon containing transparency portion is positioned behind a polygon not containing transparency portion, and it does not update the Z value in rendering processing for a pixel in a polygon containing transparency portion, if said pixel in said polygon containing transparency portion is positioned in front of a polygon not containing transparency portion.

4. The image processing device according to claim 1, wherein:

said attribute data comprises background polygons and other polygons; and said prescribed priority is set such that rendering processing is carried out for background polygons after said opaque polygons other than background polygons.

5. The image processing device according to claim 1, wherein:

said attribute data comprises background polygons and other polygons; and said prescribed priority is set such that rendering processing is carried out for said polygons other than background polygons after said background polygons.

6. The image processing device according to claim 4 or claim 5, wherein:

said rendering section carries out processing for blending the colour of the pixels in a polygon other than a background polygon with the colour of the background polygon positioned behind said polygon other than a background polygon, if said Z value of said polygon other than a background polygon is greater than a prescribed threshold value.

7. The image processing device of claim 1, wherein said polygon buffer memory is configured to store said polygon data for a frame.

8. The image processing device according to claim 1, wherein the generation of the image data is carried out in an opaque polygon, an opaque polygon including transparent portion, a semi-transparent polygon, and a semi-transparent polygon including transparent portion.

9. An image processing device for generating image data by conducting rendering processing, for a plurality of polygons, said image processing device comprising:
   a polygon data generating section for generating polygon data containing, at the least, two-dimensional co-ordinates in a display screen, a Z value (depth value) indicating a depth in the display screen, texture co-ordinates and attribute data indicating the type of polygon, for polygons positioned in a display screen, said attribute data including a semi-transparent polygon, an opaque polygon, a polygon containing transparency portion, and a polygon not containing transparency portion;
   a polygon buffer memory for storing said polygon data for a frame, said polygon data to be stored separately according to said attribute data;
   a frame buffer memory for storing said image data;
   a Z value buffer memory for storing said Z values for pixels corresponding to the image data stored in said frame buffer memory;
   a texture map memory for storing texture data for said polygons in a region corresponding to said texture co-ordinates;
   and a rendering section, which is supplied within said polygon data in a prescribed order of priority of said attribute data, and which determines a Z value for a pixel in said polygons form said polygon data, compares the Z value with a Z value stored in said Z value buffer memory, and reads out texture data corresponding to the texture co-ordinates for said pixel and generates image data containing colour data from said texture data, if the Z value for said pixel is the smaller,
   wherein said prescribed order is set such that the generation of the image date for pixels in the polygons is carried for the semi-transparent polygon after the opaque polygon, and is carried out for the polygon containing transparency portion after the polygon not containing transparency portion.

10. The image processing device according to claim 9, wherein:
   in the rendering process for said semi-transparent polygons, said rendering section carries out processing for blending the colour data of semi-transparent pixels in said semi-transparent polygon with the colour data of polygons positioned behind said semi-transparent polygons.

11. The image processing device according to claim 9, wherein:
   in the rendering process for said polygons containing transparency, said rendering section does not carry out further rendering processing for a pixel in a polygon containing transparency, if the Z value for said pixel in said polygon containing transparency is greater than a Z value stored in said Z value buffer memory, and it does not generate said colour data for a pixel in a polygon containing transparency, if the Z value for said pixel is smaller than the Z value stored in said Z value buffer memory, but the texture data for said pixel is transparent.

12. The image processing device according to claim 9, wherein:
   said attribute data comprises background polygons and other polygons; and said rendering section conducts rendering processing for all of said background polygons together, and it carries out processing for blending the colour of the pixels in a polygon other than a background polygon with the colour of the background polygon positioned behind said polygon other than a background polygon, if said Z value of said polygon other than a background polygon is greater than a prescribed threshold value.

13. An image processing method for generating image data by conducting rendering processing for a plurality of polygons, said image processing method comprising the steps of:
   generating polygon data containing, at the least, two-dimensional co-ordinates in a display screen, a Z value (depth value) indicating a depth in the display screen, and attribute data indicating the type of polygon, for polygons positioned in a display screen, said attribute data including a semi-transparent polygon, an opaque polygon, a polygon containing transparency portion, and a polygon not containing transparency portion;
   storing said polygon data for a frame in a polygon buffer memory separately according to said attribute data; and
   generating said image data for pixels in said polygons from said polygon data, in a prescribed order of priority relating to said attribute data in said polygon data,
   wherein said prescribed order is set such that the generation of the image data for pixels in the polygons is carried out for the semi-transparent polygon after the opaque polygon, and is carried out for the polygon containing transparency portion after the polygon not containing transparency portion.

14. The image processing method according to claim 13, wherein:
   in the rendering process for said semi-transparent polygons, said act of rendering carries out processing for blending the colour data of semi-transparent pixels in said semi-transparent polygons with the colour data of polygons positioned behind said semi-transparent polygons.

15. The image method according to claim 13, wherein:
   in the rendering process for said polygons containing transparency, said rendering step does not carry out rendering processing for a pixel in a polygon containing transparency, if said pixel in said polygon containing transparency is positioned behind a polygon not containing transparency, and it does not update the Z value in rendering processing for a pixel in a polygon containing transparency, if said pixel in said polygon containing transparency is positioned in front of a polygon not containing transparency.

16. The image processing method according to claim 13, wherein:
   said attribute data comprises background polygons and other polygons; said rendering processing is conducted for all of said background polygons together; and said rendering step carries out processing for blending the colour of the pixels in a polygon other than a background polygon with the colour of the background polygon positioned behind said polygon other than a background polygon, if said Z value of said polygon other than a background polygon is greater than a prescribed threshold value.

17. A computer-readable storage medium for storing an image processing program for generating image data by conducting rendering processing for a plurality of polygons, said image processing program being configured to operate a computer to:

generate polygon data containing, at the least, two-dimensional co-ordinates in a display screen, a Z value (depth value) indicating a depth in the display screen, and attribute data indicating the type of polygon, for polygons positioned in a display screen, said attribute data including a semi-transparent polygon, an opaque polygon, a polygon containing transparency portion, and a polygon not containing transparency portion;

store said polygon data for a frame in a polygon buffer memory separately according to said attribute data; and generate said image data for pixels in said polygons from said polygon data, in a prescribed order of priority relating to said attribute data in said polygon data, wherein said prescribed order is set such that the generation of the image data for pixels in the polygons is carried out or the semi-transparent polygon after the opaque polygon, and is carried out for the polygon containing transparency portion after the polygon not containing transparency portion.

18. The computer-readable storage medium according to claim 17, wherein:

in the rendering process for said semi-transparent polygons, said rendering routine carries out processing for blending the colour data of semi-transparent pixels in said semi-transparent polygons with the colour data of polygons positioned behind said semi-transparent polygons.

19. The computer-readable storage medium according to claim 17, wherein:

in the rendering process for said polygons containing transparency, said rendering routine does not carry out rendering processing for a pixel in a polygon containing transparency, if said pixel in said polygon containing transparency is positioned behind a polygon not containing transparency, and it does not update the Z value in rendering processing for a pixel in a polygon containing transparency, if said pixel in said polygon containing transparency is positioned in front of a polygon not containing transparency.

20. The computer-readable storage medium according to claim 17, wherein:

said attribute data comprises background polygons and other polygons; said rendering processing is conducted for all of said background polygons together; and said rendering routine carries out processing for blending the colour of the pixels in a polygon other than a background polygon with the colour of the background polygon positioned behind said polygon other than a background polygon, if said Z value of said polygon other than a background polygon is greater than a prescribed threshold value.

21. An image processing device, comprising:

a polygon data generating portion for generating polygon data containing attribute data indicating the type of said polygons, said attribute data including an opaque polygon, an opaque polygon containing transparency portion, a semi-transparent polygon, and a semi-transparent polygon containing transparency portion;

a polygon buffer memory for storing said polygon data, said polygon data to be stored separately, according to said attribute data;

a rendering section for reading out said polygon data from said polygon buffer memory in an order of priority determined on the basis of said attribute data; and a frame buffer for receiving image data from said rendering section, wherein said order of priority is set in the order of an opaque polygon, an opaque polygon containing transparency portion, a semi-transparent polygon, then a semi-transparent polygon containing transparency portion.

22. An image processing method, said method comprising:

generating polygon data for a plurality, of polygons, said polygon data containing attribute data indicating the type of said polygons, said attribute data including an opaque polygon, an opaque polygon containing transparency portion, a semi-transparent polygon, and a semi-transparent polygon containing transparency portion;

storing said polygon data in a polygon buffer memory;

reading out said polygon data from said polygon buffer memory in an order of priority determined on the basis of attribute data; and writing image data based on said polygon data to a frame buffer in the order that said polygon data is read out, wherein said order of priority is set in the order of an opaque polygon, an opaque polygon containing transparency portion, a semi-transparent polygon, then a semi-transparent polygon containing transparency portion.

23. A computer-readable storage medium for storing an image processing program, said image processing program being configured to operate a computer to:

generate polygon data containing attribute data, said attribute data indicating for a plurality of polygons, the type of said polygons, said attribute data including an opaque polygon, an opaque polygon containing transparency portion, a semi-transparent polygon, and a semi-transparent polygon containing transparency portion;

store said polygon data in a polygon buffer memory;

read out said polygon data from said polygon buffer memory in an order of priority determined on the basis of said attribute data; and write image data based on said polygon data to a frame buffer in the order that said polygon data is read out, wherein said order of priority is set in the order of an opaque polygon, an opaque polygon containing transparency portion, a semi-transparent polygon, then a semi-transparent polygon containing transparency portion.

* * * * *